United States Patent
Oshima et al.

(10) Patent No.: US 8,285,210 B2
(45) Date of Patent: Oct. 9, 2012

(54) MOBILE TERMINAL DEVICE AND METHOD AND COMPUTER PROGRAM PRODUCT FOR ESTABLISHING WIRELESS CONNECTION

(75) Inventors: Yukiko Oshima, Tokyo (JP); Takanori Nagahara, Tokyo (JP); Shizu Kanauchi, Kanagawa (JP); Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 316 days.

(21) Appl. No.: 12/558,960

(22) Filed: Sep. 14, 2009

(65) Prior Publication Data

US 2010/0069008 A1  Mar. 18, 2010

(30) Foreign Application Priority Data

Sep. 17, 2008 (JP) ................................. 2008-238552
Jul. 1, 2009 (JP) ................................. 2009-157119

(51) Int. Cl.
*H04B 7/00* (2006.01)
*H04B 1/38* (2006.01)

(52) U.S. Cl. ..................... 455/41.2; 455/41.1; 455/41.3; 455/566; 358/1.15

(58) Field of Classification Search .................. 455/41.1, 455/41.2, 41.3, 566; 358/1.15
See application file for complete search history.

(56) References Cited

U.S. PATENT DOCUMENTS

| | | | |
|---|---|---|---|
| 6,922,725 B2 * | 7/2005 | Lamming et al. | 709/227 |
| 7,970,350 B2 * | 6/2011 | Sheynman et al. | 455/41.1 |
| 2004/0004736 A1 * | 1/2004 | Ogura et al. | 358/1.15 |
| 2005/0086282 A1 * | 4/2005 | Anderson et al. | 709/200 |
| 2007/0075990 A1 | 4/2007 | Sahashi et al. | |
| 2007/0195364 A1 | 8/2007 | Umehara et al. | |
| 2007/0198102 A1 | 8/2007 | Umehara et al. | |
| 2008/0046467 A1 * | 2/2008 | Nakajima | 707/104.1 |
| 2008/0051032 A1 * | 2/2008 | Hashimoto | 455/41.3 |
| 2009/0103124 A1 * | 4/2009 | Kimura et al. | 455/41.3 |

FOREIGN PATENT DOCUMENTS

| | | |
|---|---|---|
| JP | 3475188 | 9/2003 |
| JP | 2004-80755 | 3/2004 |
| JP | 2004-200887 | 7/2004 |
| JP | 2007-174215 | 7/2007 |
| JP | 2009-37566 | 2/2009 |

* cited by examiner

*Primary Examiner* — Wen Huang
(74) *Attorney, Agent, or Firm* — Cooper & Dunham LLP

(57) ABSTRACT

A mobile terminal device establishes a wireless connection by a first communication unit with an information processing apparatus, and establishes a wireless communication by a second communication unit that is capable of enabling a wireless communication in a wider range based on communication setting information received through the first communication unit. A setting-item acquiring unit receives a setting item for an information processing performed by the information processing apparatus through the second communication unit. A setting-screen display unit displays a setting screen with which a value of the setting item can be selected.

8 Claims, 19 Drawing Sheets

FIG. 4

| AUTHENTICATION ID | PRINTER ID | SCANNER ID | COPIER ID |
|---|---|---|---|
| person 1 | USE-AUTHORIZED | USE-AUTHORIZED | USE-AUTHORIZED |
| person 2 | USE-UNAUTHORIZED | USE-AUTHORIZED | USE-UNAUTHORIZED |
| ⋮ | ⋮ | ⋮ | ⋮ |

FIG. 5

| FUNCTION ID | SETTING ID | CANDIDATE VALUE |
|---|---|---|
| PRINTER ID | ... | ... |
| | 2-SIDED PRINTING | ON |
| | | OFF |
| | COMBINE | ON |
| | | OFF |
| | COLOR | – |
| | | OFF |
| | FINISHER | ON |
| | | OFF |
| | ... | ... |
| SCANNER ID | ... | ... |
| | RESOLUTION | 300 |
| | | 400 |
| | | 600 |
| | | 1200 |
| | ... | ... |
| ... | ... | ... |
| | ... | ... |

FIG. 6

```xml
<?xml version="1.0" encoding="UTF-8"?>
<requestPrintStart>
        <fileName>C:\test.txt</fileName>
        <condition>
                <mode>
                        <func>Print</func>
                        <propertyid>1</propertyid>
                        <value>2</value>
                </mode>
                <mode>
                        <func>Print</func>
                        <propertyid>2</propertyid>
                        <value>2</value>
                </mode>
                <mode>
                        <func>Print</func>
                        <propertyid>3</propertyid>
                        <value>2</value>
                </mode>
                <mode>
                        <func>Print</func>
                        <propertyid>4</propertyid>
                        <value>4</value>
                </mode>
                <mode>
                        <func>Print</func>
                        <propertyid>5</propertyid>
                        <value>1</value>
                </mode>
                <mode>
                        <func>Print</func>
                        <propertyid>6</propertyid>
                        <value>1</value>
                </mode>
        </condition>
</requestPrintStart>
```

FIG. 16

| MODEL INFORMATION | SET CONTENTS |
|---|---|
| imagio Neo C 455 | A4/1-SIDED/FULL COLOR/LANDSCAPE/2 SETS... |
| imagio Neo C 455it | A5/2-SIDED/FULL COLOR/PORTRAIT /1 SET... |
| IPSiO CX SP C810 | B5/1-SIDED/FULL COLOR/LANDSCAPE/2 SETS... |
| IPSiO CX 2500 | A4/1-SIDED/MONOCHROME/LANDSCAPE/1 SET... |

FIG. 18

| LOCATION | SET CONTENTS |
|---|---|
| KOISHIKAWA OFFICE | A4/1-SIDED/FULL COLOR/LANDSCAPE/2 SETS... |
| OMORI OFFICE BLDG. No.1 | A5/2-SIDED/FULL COLOR/PORTRAIT/1 SET... |
| OMORI HALL | B5/1-SIDED/FULL COLOR/LANDSCAPE/2 SETS... |

FIG. 19

| LOCATION | PRINT |
|---|---|
| KOISHIKAWA OFFICE | INVALID |
| OMORI OFFICE BLDG. No.1 | INVALID |
| OMORI HALL | VALID |

FIG. 21

| SETTING ITEM | SET CONTENTS |
|---|---|
| COLOR | OFF |
| 2-SIDED | ON |
| COMBINE | ON |
| STAPLE | TOP LEFT SLANT |
| ⋮ | ⋮ |

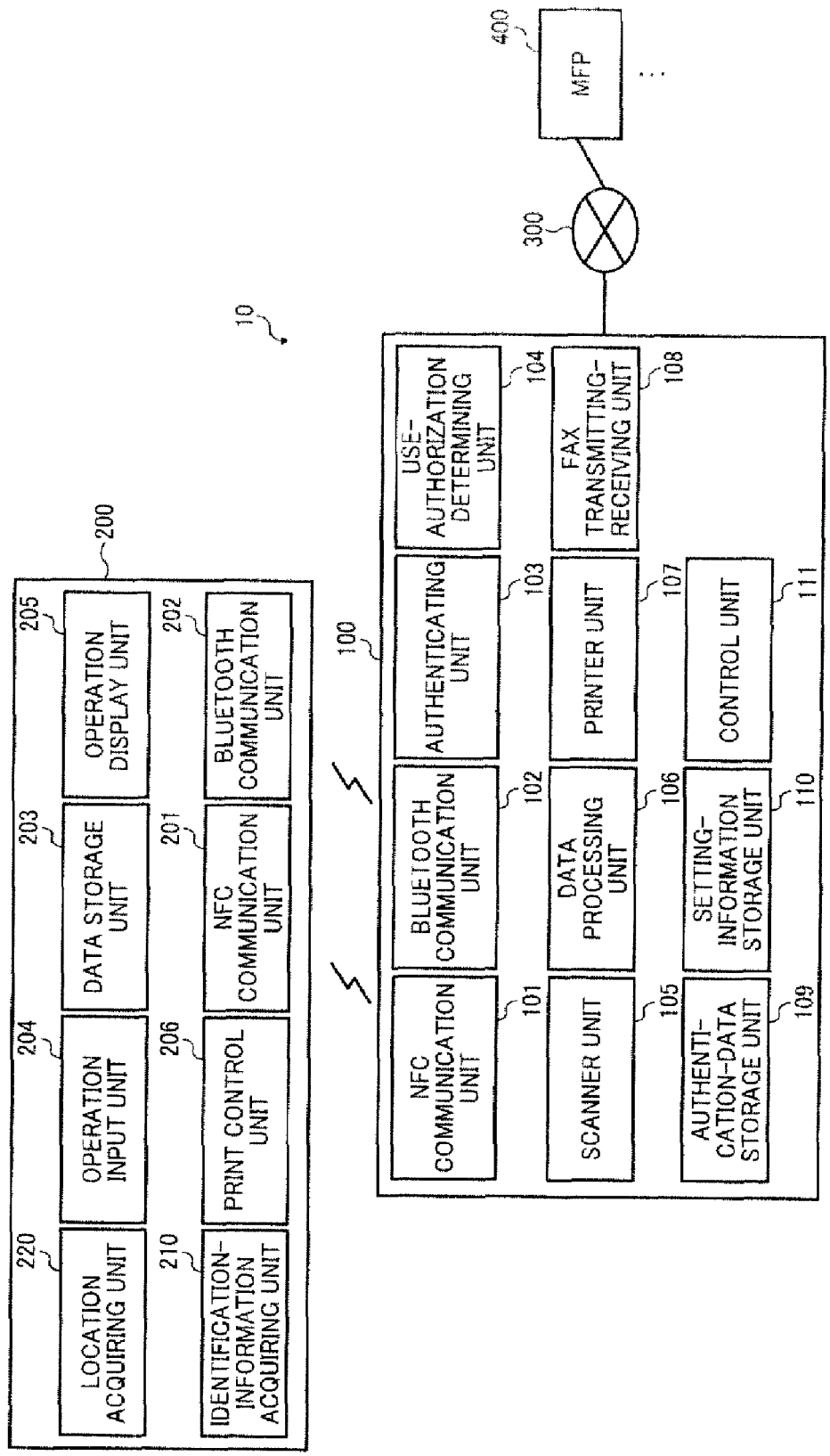

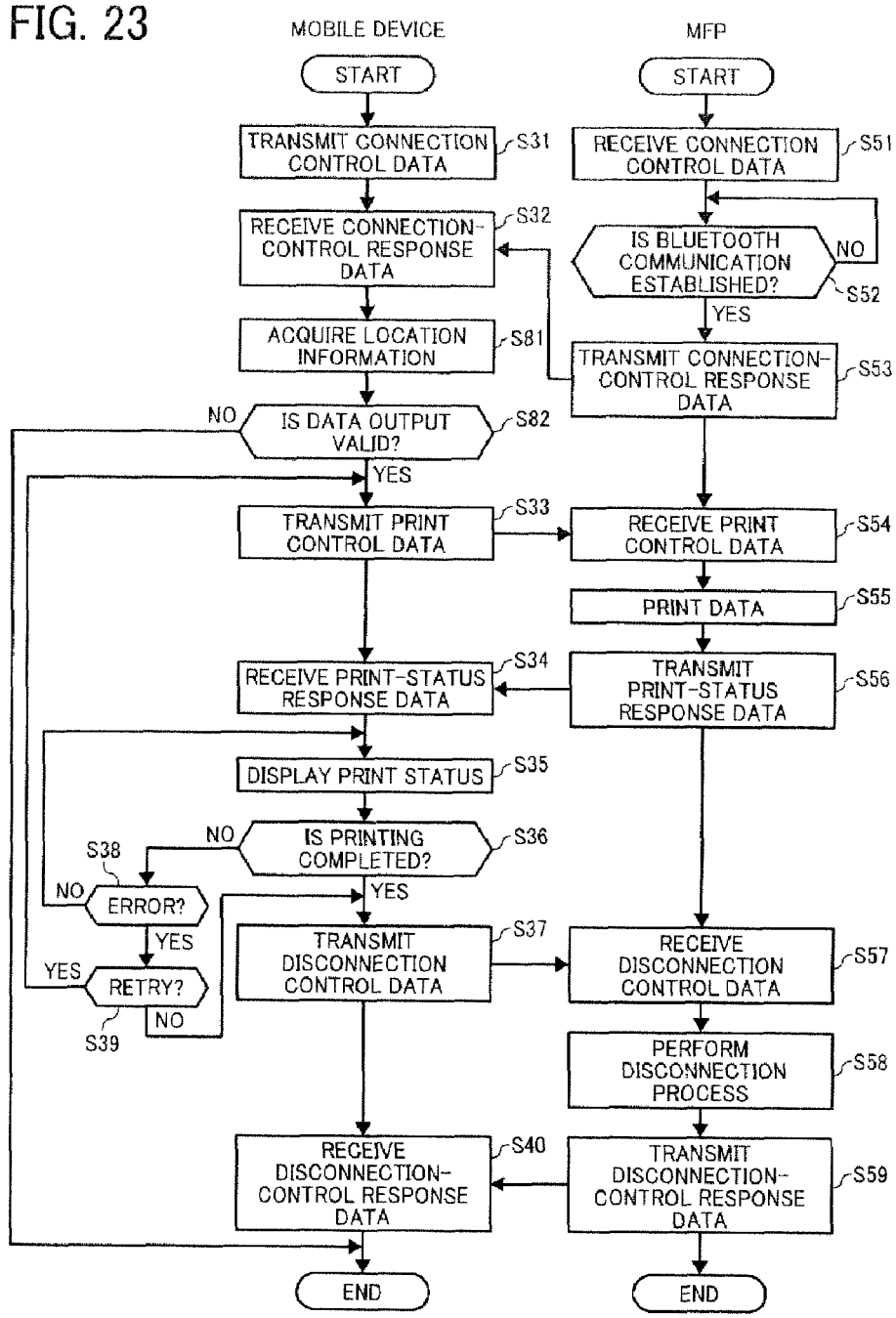

MOBILE TERMINAL DEVICE AND METHOD AND COMPUTER PROGRAM PRODUCT FOR ESTABLISHING WIRELESS CONNECTION

CROSS-REFERENCE TO RELATED APPLICATIONS

The present application claims priority to and incorporates by reference the entire contents of Japanese Patent Application No. 2008-238552 filed in Japan on Sep. 17, 2008 and Japanese Patent Application No. 2009-157119 filed in Japan on Jul. 1, 2009.

BACKGROUND OF THE INVENTION

1. Field of the Invention

The present invention relates to a technology for specifying a desired function of an information processing apparatus through a wireless communication.

2. Description of the Related Art

In recent years, office equipments, such as printers, have been used in such a manner that a plurality of the office equipments are connected to one another via a network such that a client terminal, such as a personal computer (PC), connected to the same network can specify a desired one of the office equipments to print document and the like.

Multifunction peripherals (MFPs) having a copy function, a facsimile (FAX) function, a printer function, and a scanner function in one package have also been used in the same manner. In case of the MFP, a user is allowed to specify various setting information to thereby determine whether to perform stapling, punching, and the like.

For example, Japanese Patent Application Laid-open No. 2004-200887 discloses a technology for establishing a connection between apparatuses by using a contactless integrated circuit (IC) tag. More particularly, a user is allowed to intuitively establish a connection to a target apparatus to be used for printing a document or the like by moving an intermediate terminal to the target apparatus.

However, in the technology disclosed in Japanese Patent Application Laid-open No. 2004-200887, the intermediate terminal can transmit only connection setting information to the target apparatus. Therefore, a user is not allowed to specify functional information for printing (e.g., a type of print color (color or monochrome), availability of 2-sided printing, an available print sheet size, and the like).

SUMMARY OF THE INVENTION

It is an object of the present invention to at least partially solve the problems in the conventional technology.

According to one aspect of the present invention, there is provided a mobile terminal device that establishes a wireless connection by a first communication unit when moved close to an information processing apparatus that performs an information processing, receives communication setting information for a second communication unit that is capable of enabling a wireless communication in a wider range than the first communication unit, and establishes a wireless communication by the second communication unit based on the communication setting information. The mobile terminal device includes: a setting-item acquiring unit that receives, from the information processing apparatus, a setting item relating to an information processing performed by the information processing apparatus through the second communication unit in response to a request for acquiring the setting item; and a setting-screen display unit that displays a setting screen on which a value of the setting item is displayed in a selectable manner.

Furthermore, according to another aspect of the present invention, there is provided a method of establishing a wireless communication in a mobile terminal device that establishes a wireless connection by a first communication unit when moved close to an information processing apparatus that performs an information processing, receives communication setting information for a second communication unit that is capable of enabling a wireless communication in a wider range than the first communication unit, and establishes a wireless communication by the second communication unit based on the communication setting information. The method includes: setting-item acquiring including the mobile terminal device receiving, from the information processing apparatus, a setting item relating to an information processing performed by the information processing apparatus through the second communication unit in response to a request for acquiring the setting item; and setting-screen displaying including the mobile terminal device displaying a setting screen on which a value of the setting item is displayed in a selectable manner.

Moreover, according to still another aspect of the present invention, there is provided a computer program product including a computer-usable medium having computer-readable program codes embodied in the medium for establishing a wireless communication in a mobile terminal device that establishes a wireless connection by a first communication unit when moved close to an information processing apparatus that performs an information processing, receives communication setting information for a second communication unit that is capable of enabling a wireless communication in a wider range than the first communication unit, and establishes a wireless communication by the second communication unit based on the communication setting information. The program codes when executed cause a computer to execute: setting-item acquiring including the mobile terminal device receiving, from the information processing apparatus, a setting item relating to an information processing performed by the information processing apparatus through the second communication unit in response to a request for acquiring the setting item; and setting-screen displaying including the mobile terminal device displaying a setting screen on which a value of the setting item is displayed in a selectable manner.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is an explanatory diagram of an example of formation of data stored in an authentication-data storage unit shown in FIG. 3;

FIG. 5 is an explanatory diagram of an example of formation of data stored in a setting-information storage unit shown in FIG. 3;

FIG. 6 is a schematic diagram of an example of contents of control data for starting printing;

FIG. 16 is an explanatory diagram of an example of formation of data stored in a data storage unit shown in FIG. 15;

FIG. 18 is an explanatory diagram of an example of formation of data stored in the data storage unit shown in FIG. 15;

FIG. 19 is an explanatory diagram of another example of the formation of data stored in the data storage unit shown in FIG. 15;

FIG. 21 is an example of contents of function setting information;

FIG. 22 is a block diagram of an information processing system according to a fourth embodiment of the present invention; and FIG. 23 is a flowchart of a process performed by the information processing system shown in FIG. 22.

DETAILED DESCRIPTION OF THE PREFERRED EMBODIMENTS

Exemplary embodiments of the present invention are explained in detail below with reference to the accompanying drawings.

A first embodiment of the present invention is described in detail below with reference to the accompanying drawings. In the description of the first embodiment, an information processing apparatus according to the present invention is applied to a multifunction peripheral (MFP) having a copy function, a facsimile (FAX) function, a printer function, a scanner function, and a data-distribution function of distributing input image data (e.g., image data read by the scanner function, formed by the printer function, and received by the FAX function). While the MFP is used as an example of the information processing apparatus in the following description, the present invention is not limited to the MFP and can be applied to other apparatuses such as a printer having only the printer function, a scanner having only the scanner function, or an information processing apparatus, such as an image forming apparatus, having these functions.

Figure 1:
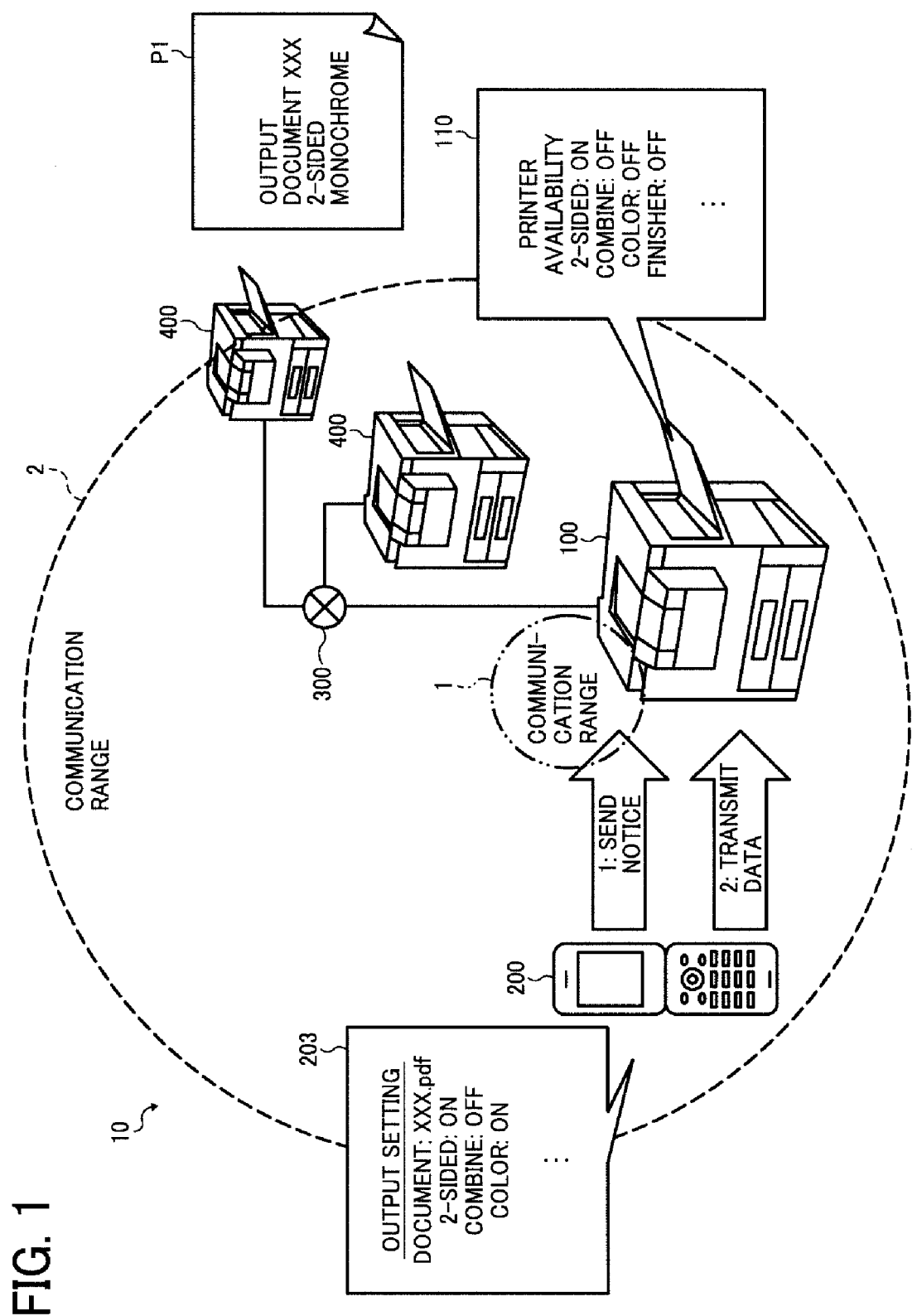
FIG. 1 is a schematic diagram of a configuration of an information processing system according to a first embodiment of the present invention.

A configuration example of an information processing system 10 including an MFP 100 and a mobile terminal device 200 according to the first embodiment is described in detail below. FIG. 1 is a schematic diagram of the configuration of the information processing system 10. The information processing system 10 includes the MFP 100 and the mobile terminal device 200. The mobile terminal device 200 is a compact computing device having a wireless communication function. Examples of the mobile terminal device 200 include a mobile phone, a notebook personal computer (PC), and a portable digital assistance (PDA). The MFP 100 is a commonly-known MFP having functions of processing print data and outputting the processed print data to a medium (e.g., a sheet).

The MFP 100 allows a user to set various settings for data processing. For example, the MFP 100 allows a user to set availability of 2-sided printing (i.e., whether to data on only one side of a medium or on both sides of a medium), availability of combining pages (i.e., whether to transfer a generated image of one page onto one side of a medium or to transfer generated images of two pages altogether onto one side of a medium by reducing a size of each of the images), availability of color printing (i.e., whether to perform color printing or monochrome printing), and availability of a finisher (i.e., whether to perform a finishing process such as stapling or punching).

The MFP 100 and the mobile terminal device 200 communicate with each other in a communication range 1 indicated by a dashed line in FIG. 1 and a communication range 2 indicated by a chain double-dashed line in FIG. 1 by using two communication units, which will be described later. The MFP 100 is connected to a network 300, and is also connected to other MFPs 400, a FAX machine (not shown), a client terminal (not shown), and the like via the network 300. In the example shown in FIG. 1, a user is allowed to set an output setting of the mobile terminal device 200 with respect to the MFP 100 such that data of document "XXX.pdf" is to be output, a setting of 2-sided printing ("2 sided") is ON, a setting of combining pages ("combine") is OFF, and a setting of color printing ("color") is ON. The user is also allowed to set availability of the printer function of the MFP 100 such that a setting of 2-sided printing ("2 sided") is ON, a setting of combining pages ("combine") is OFF, a setting of color printing ("color") is OFF, and a setting of a finisher ("finisher") is OFF. With these settings, as shown in FIG. 1, document data P1 is output as a 2-sided monochrome document having no combined pages through a printing process that will be described later.

Figure 2:
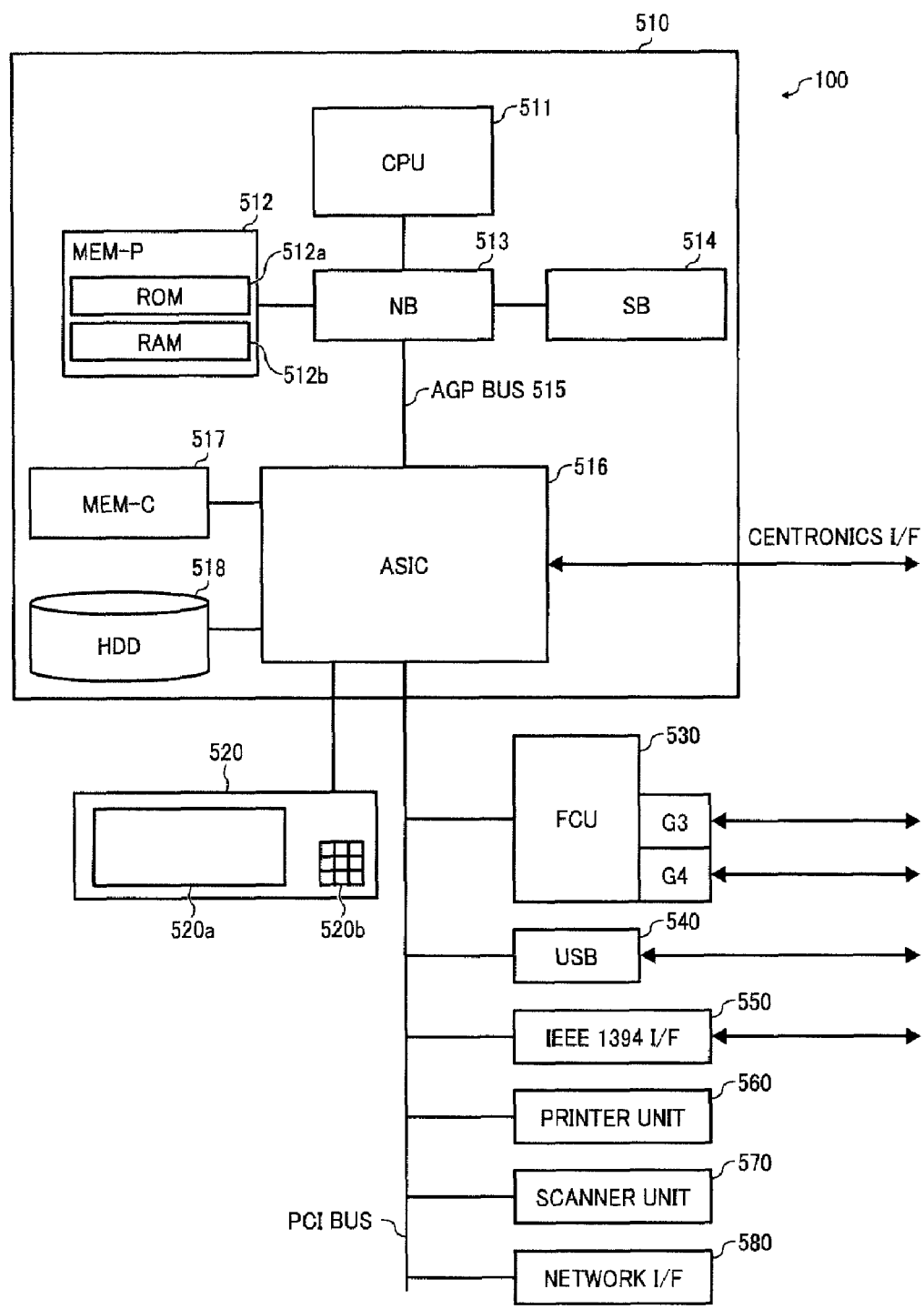
FIG. 2 is an explanatory diagram of a hardware configuration of a multifunction peripheral (MFP) shown in FIG. 1.

A hardware configuration of the MFP 100 is described below. FIG. 2 is a block diagram of the hardware configuration of the MFP 100. The MFP 100 includes a controller 510, a printer unit 560, and a scanner unit 570, which are connected to one another via a peripheral component interconnect (PCI) bus. The controller 510 entirely controls the MFP 100, image drawing, communication, and input from an operating unit 520. Each of the printer unit 560 and the scanner unit 570 includes an image processing unit (not shown) that performs error diffusion, gamma transformation, and the like. The operating unit 520 includes an operation display member 520a and a keyboard member 520b. The operation display member 520a is used for displaying, for example, information of an image of an original read by the scanner unit 570 on a liquid crystal display (LCD), and receiving an input from a user operating the operating unit 520 via a touch panel. The keyboard member 520b is used for receiving a key input from the user.

The MFP 100 allows a user to switch over a document-box function, the copy function, the printer function, and the FAX function from one to the other to select one of these functions by using an application switch key (not shown) of the operating unit 520. The MFP 100 enters a document-box mode when the document-box function is selected, enters a copy mode when the copy function is selected, enters a printer mode when the printer function is selected, and enters a FAX mode when the FAX function is selected.

The controller 510 also includes a central processing unit (CPU) 511 as a main unit of a computer, a system memory (MEM-P) 512, a north bridge (NB) 513, a south bridge (SB) 514, an application specific integrated circuit (ASIC) 516, a local memory (MEM-C) 517 as a storage unit, and a hard disk drive (HDD) 518 as a storage unit. The NB 513 and the ASIC 516 are connected to each other via an accelerated graphics port (AGP) bus 515. The MEM-P 512 includes a read only memory (ROM) 512a and a random access memory (RAM) 512b.

The CPU 511 entirely controls the MFP 100, includes a chipset constituted of the NB 513, the MEM-P 512, and the SB 514, and is connected to other apparatuses (not shown) via the chipset.

The NB 513 is a bridge for connecting the CPU 511, the MEM-P 512, the SB 514, and the AGP bus 515 to one another. The NB 513 includes a memory controller (not shown), a PCI master (not shown), and an AGP target (not shown). The memory controller controls data read and data write with respect to the MEM-P 512.

The MEM-P 512 is a system memory used for storing computer programs and data, loading the computer programs and the data, and drawing images for printing. The MEM-P 512 includes the ROM 512a and the RAM 512b. The ROM 512a is a read only memory used for storing computer programs and data for controlling operation of the CPU 511. The RAM 512b is a writable and readable memory used for loading the computer programs and the data and drawing images for printing.

The SB 514 is a bridge for connecting the NB 513, a PCI device (not shown), and a peripheral device (not shown) to one another. The SB 514 is connected to the NB 513 via the PCI bus. A network interface (I/F) unit 580 is also connected to the PCI bus.

The ASIC 516 is an integrated circuit (IC) customized for performing image processing, and includes hardware components for the image processing. The ASIC 516 functions as a bridge for connecting the AGP bus 515, the PCI bus, the HDD 518, and the MEM-C 517 to one another. The ASIC 516 includes, although the following components are not shown, a PCI target, an AGP master, an arbiter (ARB) that functions as a main part of the ASIC 516, a memory controller that controls the MEM-C 517, a plurality of direct memory access controllers (DMACs) that rotates image data by using a hardware logic and the like, and a PCI unit that transfers data between the printer unit 560 and the scanner unit 570 via the PCI bus. Each of a FAX control unit (FCU) 530, a universal serial bus (USB) 540, and the Institute of Electrical and Electronics Engineers 1394 (IEEE 1394) I/F 550 is connected to the ASIC 516 via the PCI bus.

The MEM-C 517 is a local memory used as a copy image buffer and a code buffer. The HDD 518 is a storage device for storing image data, computer programs for controlling the operation of the CPU 511, font data, and form data.

The AGP bus 515 is a bus I/F for a graphics accelerator card designed for increasing speed of graphics processing. The AGP bus 515 directly accesses the MEM-P 512 with high throughput to increase the speed of the graphics accelerator card.

The computer programs executed by the MFP 100 are stored in advance in a ROM and the like for distribution. The computer programs executed by the MFP 100 can also be recorded, in a file format installable and executable on the MFP 100, in a recording medium readable by the MFP 100, such as a compact disk-ROM (CD-ROM), a flexible disk (FD), a compact disk-recordable (CD-R), and a digital versatile disk (DVD) for distribution.

Furthermore, the computer programs executed by the MFP 100 can be stored in another computer connected to the MFP 100 via a network such as the Internet such that the computer programs can be downloaded to the MFP 100 via the network. Moreover, the computer programs executed by the MFP 100 can be provided or distributed via a network such as the Internet.

The computer programs executed by the MFP 100 is made up of modules that implement units of the MFP 100, which will be described later (i.e., a near field communication (NFC) communication unit 101, a Bluetooth communication unit 102, an authenticating unit 103, an use-authorization determining unit 104, a data processing unit 106, a FAX transmitting-receiving unit 108, and a control unit 111 (see FIG. 3)). As actual hardware, when the CPU (processor) reads and executes the computer programs from the ROM, the above modules are loaded on a main memory thereby creating, on the main memory, the units, i.e., the NFC communication unit 101, the Bluetooth communication unit 102, the authenticating unit 103, the use-authorization determining unit 104, the data processing unit 106, the FAX transmitting-receiving unit 108, and the control unit 111.

Figure 3:
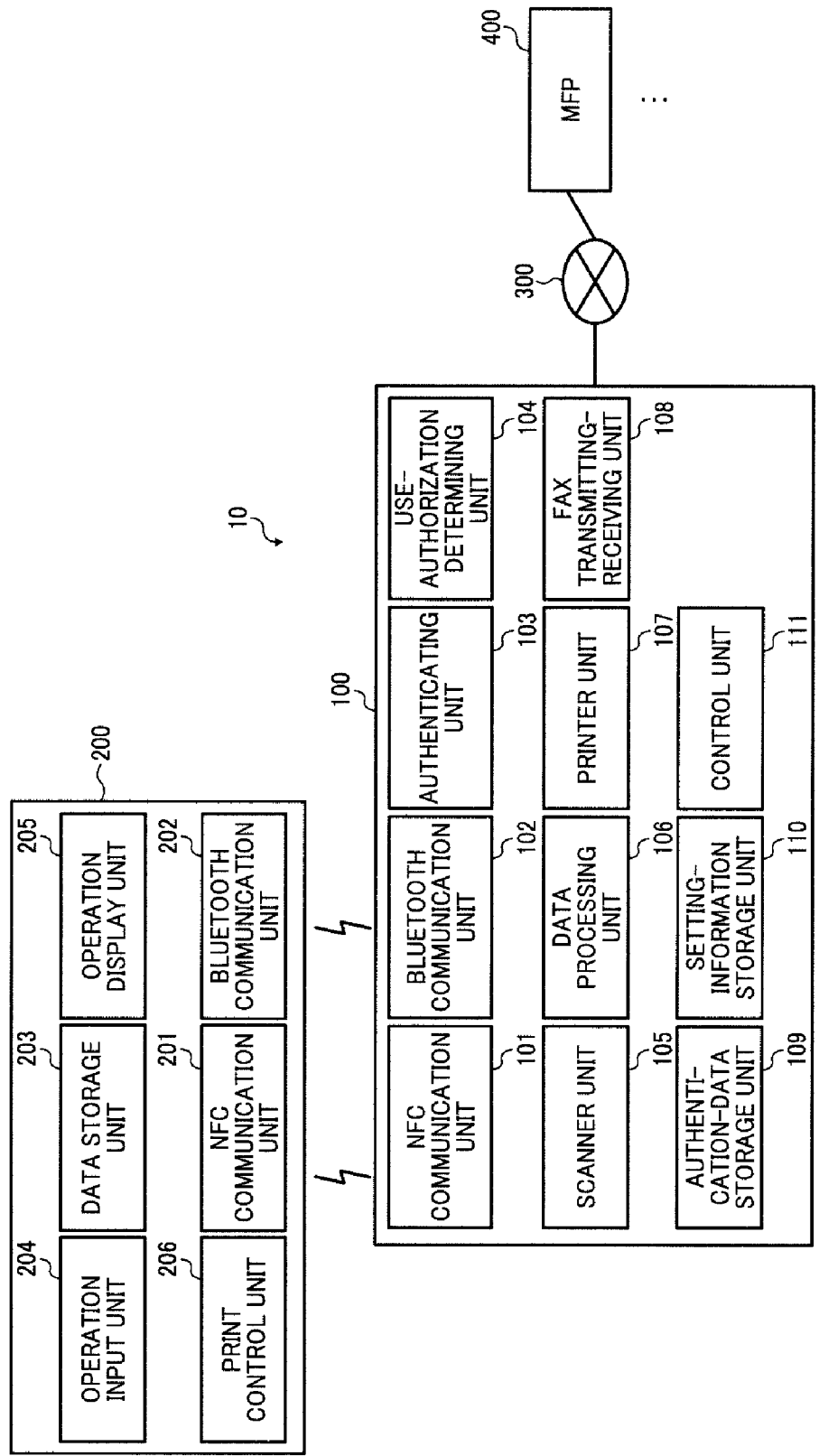
FIG. 3 is a block diagram of the information processing system shown in FIG. 1.

FIG. 3 is a block diagram of the information processing system 10. The MFP 100 includes the NFC communication unit 101, the Bluetooth communication unit 102, the authenticating unit 103, the use-authorization determining unit 104, a scanner unit 105, the data processing unit 106, a printer unit 107, the FAX transmitting-receiving unit 108, an authentication-data storage unit 109, a setting-information storage unit 110, and the control unit 111.

The control unit 111 controls each of the NFC communication unit 101, the Bluetooth communication unit 102, the authenticating unit 103, the use-authorization determining unit 104, the scanner unit 105, the data processing unit 106, the printer unit 107, the FAX transmitting-receiving unit 108, the authentication-data storage unit 109, and the setting-information storage unit 110.

The NFC communication unit 101 enables a contactless communication with the mobile terminal device 200 based on a wireless communication standard for a contactless IC, which is called near field communication (NFC), and functions as a near-field communication unit. More particularly, the NFC communication unit 101 is a reader-writer containing a communication control program for reading, in a contactless manner, information from a tag of an NFC communication unit 201 of the mobile terminal device 200, which will be described later. The NFC communication unit 101 enables, as one communication unit, a contactless wireless communication for exchanging data with an apparatus in a shorter range compared to the Bluetooth communication unit 102 that functions as another communication unit. More particularly, a communication range of the NFC communication unit 101 is from 0 mm to about 10 mm. The NFC communication unit 101 enables a contactless communication based on the NFC standard at a data transfer rate (i.e., 100 Kbps to 400 Kbps) lower than a data transfer rate (i.e., 1 Mbps to 2 Mbps) of the Bluetooth communication unit 102 that enables a wireless communication based on the Bluetooth (registered trademark) standard. Therefore, the NFC communication unit 101 is used for exchanging a relatively small amount of data. The communication standard employed by the NFC communication unit 101 is not limited to the NFC standard, and can be other communication standards that enable a wireless communication in a communication range smaller than a communication range of a wireless communication based on the Bluetooth standard, which will be described later. The NFC communication unit 101 functions as a first communication unit according to the present invention.

The NFC communication unit 101 establishes a communication with the NFC communication unit 201 of the mobile terminal device 200 when the mobile terminal device 200 is moved closer to the communication range of the NFC communication unit 101. Then, the NFC communication unit 101 receives an authentication identification (ID), a function ID, communication setting information, and function setting information that are transmitted from the mobile terminal device 200. The authentication ID is information (authentication information) for determining whether to allow use of the MFP 100 according to an instruction from the mobile terminal device 200. The authentication ID can be, for example, information uniquely assigned to the mobile terminal device 200 and information for identifying an owner of the mobile terminal device 200. Examples of the information for identifying the owner include an employee ID. The function ID is information (function information) indicating a function of the MFP 100 to be used according to a request from the mobile terminal device 200. For example, when the printer function of the MFP 100 is used, "printer ID" is set to the function ID, and, when the scanner function of the MFP 100 is used, "scanner ID" is set to the function ID.

The communication setting information is information needed when the Bluetooth communication unit 102 enables a wireless communication. Thus, the mobile terminal device 200 and the MFP 100 exchange the communication setting information to be used for the Bluetooth communication with each other through the NFC communication that enables data exchange easily. Therefore, a user of the mobile terminal device 200 can identify the MFP 100 as a communication object only by moving the mobile terminal device 200 closer to the MFP 100 without performing specific operation, and a Bluetooth communication is thereby enabled. Thus, user's usability of the MFP 100 and the mobile terminal device 200 can be improved. The function setting information is setting information for instructing processing content based on a function. For example, when the printer ID is set to the function ID, print setting information is set as the function setting information in such a manner that a set value "ON" or "OFF" is set to a setting ID "2-sided printing" and a set value "ON" or "OFF" is set to a setting ID "combine". Furthermore, when the scanner ID is set to the function ID, scan setting information is set as the function setting information in such a manner that a set value "300" dot per screen (dps) is set to a setting ID "resolution".

The function setting information contains status information and setting information of the MFP 100, each containing items and values associated with the respective items. For example, the items representing the status of the MFP 100 include a connection status of each tray, an amount of sheets remained in each tray, a size of sheets in each tray, a connection status of a stapling unit, and a connection status of a punching unit. The setting information contains items such as the number of sheets to be printed, print color, a print sheet tray, a print sheet size, a print sheet type, availability of 2-sided printing, availability of sorting of printed sheets, availability of stapling on printed sheets, availability of punching on printed sheets, combining of print pages, a sheet discharge tray, resolution, and availability of a faint background pattern. Furthermore, the function setting information can include a printer description language of the MFP 100 (e.g., postscript, portable document format (PDF), printer control language (PCL), and printer job language (PJL)).

The authenticating unit 103 determines whether the authentication ID transmitted from the mobile terminal device 200 is authorized to use the MFP 100. More particularly, the authenticating unit 103 determines whether the authentication ID received by the NFC communication unit 101 matches an authentication ID stored in the authentication-data storage unit 109 to perform authentication.

The use-authorization determining unit 104 determines whether the function ID transmitted by the mobile terminal device 200 is authorized to use the MFP 100. More particularly, the use-authorization determining unit 104 acquires, from the authentication-data storage unit 109, use-authorization information corresponding to the authentication ID and the function ID received by the NFC communication unit 101, and determines whether use is authorized in the acquired use-authorization information.

The Bluetooth communication unit 102 enables a contactless communication with the mobile terminal device 200 based on the Bluetooth® standard, and functions as a short-range communication unit. The Bluetooth communication unit 102 that employs a wireless communication system based on the Bluetooth® standard enables exchange of a larger amount of data at a higher data transfer rate (from 1 Mbps to 2 Mbps) compared to the NFC communication unit 101 that employs a contactless communication system based on the NFC standard. Furthermore, the Bluetooth communication unit 102 that employs the wireless communication system based on the Bluetooth® standard enables a communication between apparatuses over a 10-meter (m) or shorter distance. Thus, the communication range of the Bluetooth communication unit 102 is larger than that of the communication system based on the NFC standard.

The Bluetooth communication unit 102 includes a Bluetooth® I/F (not shown), such as a transceiver based on the Bluetooth® standard, for transmitting and receiving data, and a communication control unit (not shown). The Bluetooth® I/F transmits data to and receives data from the mobile terminal device 200 as a communication destination. The communication control unit is a communication control program for establishing a wireless communication based on the Bluetooth® standard by exchanging communication setting information with the communication destination via the Bluetooth® I/F before data is transmitted to and received from the mobile terminal device 200. Unique address information assigned to the Bluetooth® I/F is used as the communication setting information.

While, in the first embodiment, the Bluetooth communication unit 102 compliant with the Bluetooth® standard is used for performing a wireless communication, the present invention is not limited to this example. For example, it is possible to employ, for performing the wireless communication, the wireless fidelity (WiFi) system based on the IEEE 802.11a/IEEE 802.11b standard instead of the Bluetooth® standard. In this case, it is preferable to configure a WiFi communication unit including a network board based on the IEEE 802.11a/IEEE 802.11b standard and a communication control unit (i.e., a communication control program) for controlling establishment of a wireless communication, data transmission, and data reception based on the IEEE 802.11a/IEEE 802.11b standard. Furthermore, for a communication between apparatuses each employing the ultra-wideband (UWB) communication system and located over a 3-m distance or shorter, it is possible to employ, for performing a wireless communication, the wireless USB standard that enables a communication at 480 Mbps comparable to a wired USB 2.0. In this case, it is preferable to configure a USB communication unit including a USB device based on the wireless USB standard for exchanging data, and a communication control unit (i.e., a communication control program) for controlling establishment of a wireless communication, data transmission, and data reception based on the UWB communication system.

The Bluetooth communication unit 102 receives the communication setting information from the mobile terminal device 200 through the NFC communication. When a Bluetooth communication is established with the mobile terminal device 200 based on the received communication setting information, the Bluetooth communication unit 102 exchanges data corresponding to the function ID with the mobile terminal device 200. The data to be exchanged can be image data, document data, text data, and various other data.

The scanner unit 105 reads an original by using an imaging device such as a charge coupled device (CCD). The scanner unit 105 can include an automatic document feeder (ADF) to enable automatic document feed.

The data processing unit 106 performs processing corresponding to the function ID and the function setting information (function setting condition) received by the NFC communication unit 101 on data received or transmitted by the Bluetooth communication unit 102. For example, when the "printer ID" is set to the function ID, the data processing unit 106 performs image processing for adjusting tone or color, layout processing for 1-sided printing or 2-sided printing, and the like on the data based on the function setting information. Furthermore, when the "scanner ID" is set to the function ID, the data processing unit 106 performs image processing, layout processing, and the like on data read by the scanner unit 105 based on the function setting condition.

The printer unit 107 prints data that has been subjected to the image processing, the layout processing, and the like by the data processing unit 106.

The FAX transmitting-receiving unit 108 transmits data read by the scanner unit 105 or data transmitted from the mobile terminal device 200 to the other MFPs 400, the FAX machine, the client terminal, and the like via the network 300. The FAX transmitting-receiving unit 108 also receives data transmitted from the MFPs 400, the FAX machine, the client terminal, and the like.

The authentication-data storage unit 109 stores therein authentication data used for determining whether use of the MFP 100 or functions of the MFP 100 is authorized. FIG. 4 is an explanatory diagram of an example of contents of data stored in the authentication-data storage unit 109. The authentication-data storage unit 109 stores therein the authentication ID, the function ID, and the use-authorization information, in an associated manner. As shown in FIG. 4, an authentication ID "person1" is authorized to use all of the printer function, the scanner function, and the copy function. Furthermore, an authentication ID "person2" is authorized to use only the scanner function of the MFP 100 and is not authorized to use the printer function and the copy function.

As shown in FIG. 5, the setting-information storage unit 110 stores therein, as the function setting information, the function ID, the setting ID, and a candidate value for each of the functions of the MFP 100, in an associated manner. For example, regarding the printer function, either "ON" or "OFF" can be set to the setting of "2-sided printing" while only "OFF" can be set to the setting of "color", which means that only monochrome printing is available. Thus, because processing contents of each of the functions generally depends on a model of the MFP 100, the MFP 100 stores therein the function ID, the setting ID corresponding to the function ID, and the candidate value available for the setting ID.

The mobile terminal device 200 is described in detail below. The mobile terminal device 200 is configured as a computer including a CPU (processor), a ROM, a RAM, and the like. Computer programs executed by the mobile terminal device 200 are stored in advance in a ROM and the like for distribution. The computer programs executed by the mobile terminal device 200 can also be recorded, in a file format installable and executable on the mobile terminal device 200, in a recording medium readable by the mobile terminal device 200, such as a semiconductor memory.

Furthermore, the computer programs executed by the mobile terminal device 200 can be stored in another computer connected to the mobile terminal device 200 via a network such as the Internet such that the computer programs can be downloaded to the mobile terminal device 200 via the network. Moreover, the computer programs executed by the mobile terminal device 200 can be provided or distributed via a network such as the Internet.

The computer programs executed by the mobile terminal device 200 is made up of modules that implement units of the mobile terminal device 200, which will be described later (i.e., the NFC communication unit 201, a Bluetooth communication unit 202, and a print control unit 206 (see FIG. 3)). As actual hardware, when the CPU reads and executes the computer programs from the ROM, the above modules are loaded on a main memory thereby creating, on the main memory, the units, i.e., the NFC communication unit 201, the Bluetooth communication unit 202, and the print control unit 206. The mobile terminal device 200 can be, for example, a mobile phone, a PDA, a notebook PC, and a mobile storage medium.

As shown in FIG. 3, the mobile terminal device 200 includes the NFC communication unit 201, the Bluetooth communication unit 202, a data storage unit 203, an operation input unit 204, an operation display unit 205, and the print control unit 206.

The NFC communication unit 201 establishes a communication with the NFC communication unit 101 of the MFP 100 when the mobile terminal device 200 is moved closer to the communication range of the NFC communication unit 101 of the MFP 100. Then, the NFC communication unit 201 transmits the authentication ID and the function ID for enabling the mobile terminal device 200 to use the MFP 100, the communication setting information for establishing a communication with the Bluetooth communication unit 202, and the function setting information.

More particularly, the NFC communication unit 201 is configured as an NFC chip provided with a tag and a communication control program for controlling establishment of a communication, data transmission, and data reception. The authentication ID and the function ID are stored in the tag. When the NFC communication unit 201 is moved closer to the MFP 100, a communication is established between the mobile terminal device 200 and the MFP 100 and then the NFC communication unit 101 (reader-writer) of the MFP 100 reads the information stored in the tag, so that the information is transmitted to the MFP 100.

It is possible to store an NFC chip provided with the tag and the communication control program in a contactless IC card so that the authentication ID and the function ID can be transmitted to the MFP 100 independent of a main body of the mobile terminal device 200.

While, in the first embodiment, it is assumed that the NFC communication unit 201 of the mobile terminal device 200 is provided with the tag containing the authentication ID and the function ID and the NFC communication unit 101 of the MFP 100 functions as a reader-writer, the present invention is not limited to this example. It is possible to configure such that the NFC communication unit 201 of the mobile terminal device 200 functions as the reader-writer and the NFC communication unit 101 of the MFP 100 includes the tag. In this case, a preferable configuration may be as follows. That is, the authentication ID and the function ID are stored in advance in the data storage unit 203 of the mobile terminal device 200, and when a communication is established by moving the NFC communication unit 201 closer to the MFP 100, the authentication ID and the function ID stored in the data storage unit 203 are transferred to the NFC communication unit 201 by a control unit (not shown), and the NFC communication unit 201 functioning as the reader-writer transmits the transferred authentication ID and the transferred function ID to the NFC communication unit 101 (tag) of the MFP 100 to write the authentication ID and the function ID in the tag.

The Bluetooth communication unit 202 transmits, when the communication with the Bluetooth communication unit 102 of the MFP 100 is established, the data stored in the data storage unit 203 to the MFP 100. The Bluetooth communication unit 202 also receives data that has been processed by using the functions of the MFP 100.

The data storage unit 203 stores therein data for using the functions of the MFP 100. For example, when the printer function of the MFP 100 is used, the communication setting information, the print setting information as the function setting information, and image data are stored in the data storage unit 203. The function setting information is stored in the following data format: "setting ID: set value". The setting ID is information indicating processing content of a function of the MFP 100. For example, for the printer function, "2-sided printing" can be set to the setting ID. The set value is a value that is selected from among candidate values that can be set to the setting ID, based on processing to be performed on data. For example, the set value "ON" can be set for the setting ID "2-sided printing".

The operation input unit 204 includes an operation button (not shown) such as a push button, and receives input of the function ID, the setting ID, and the candidate value from a user. For example, when a user selects and specifies a candidate value from the candidate values stored in the data storage unit 203 for using the MFP 100, the user can specify either "ON" or "OFF" by pressing the operation button and the like of the operation input unit 204. Control data for using the MFP 100, which is received in the above-described manner, is stored in the data storage unit 203 and is also sent to the print control unit 206.

The print control unit 206 transmits the control data to the MFP 100 via the Bluetooth communication unit 202. The MFP 100 performs processing, such as print start, print stop, print data generation, setting information acquisition, and print status acquisition, based on the control data. The print control unit 206 also sends, to the operation display unit 205, response data, setting information, or the like corresponding to the control data received from the MFP 100.

FIG. 6 is a schematic diagram of an example of contents of the control data for starting printing (hereinafter, referred to as "print-start control data" as appropriate). In the example shown in FIG. 6, the print-start control data containing the function setting information is written in an extensible markup language (XML).

A request for starting printing is made by "requestPrintStart". More particularly, a file name and print setting information of print data are written within a "requestPrintStart" tag in a nested manner. The file name is written in a "fileName" tag and the setting information is written in a "mode" tag. The mode tag contains a "func" tag indicating a function, a "propertyid" tag indicating an ID of a setting item, and a "value" tag indicating a value of a setting item. More particularly, the "func" tag contains a name of a function used for processing data, such as print or scan. In this example, "Print" is written as a name of a function of printing data to be performed by a printer according to an instruction from a mobile terminal device.

The "propertyid" tag contains an ID number of the setting item. For example, a serial number 1, 2, . . . is assigned in advance to each item contained in the above-mentioned setting information, i.e., the number of sheets to be printed, print color, etc. The "value" tag contains a value of the setting item in such a manner that the number of sheets to be printed, the set value of the print color as the setting item, or the like is written in numbers. A serial number is also associated with each set value of the setting item of print color in advance in such a manner that 1 is associated with automatic color, 2 is associated with color, and 3 is associated with monochrome. Therefore, in the example shown in FIG. 6, an item having both the "propertyid" tag containing 2 and the "value" tag containing 2 indicates that the color is selected as the setting item of the print color.

While, in the first embodiment, it is explained that the control data is written in XML, other formats can be applied as long as the control data is written in a structured document. For example, it is possible to use hyper text markup language (HTML). Furthermore, while it is assumed that the control data written in XML contains keywords, such as the setting item, in a tag format, it is possible to write the control data in a non-structured format, such as a plain text format, as long as a keyword used for performing control can be identified and a value associated with the keyword can be extracted.

The operation display unit 205 includes a screen unit (not shown), such as a liquid crystal display, and displays the communication setting information and the function setting information that are stored in the data storage unit 203. For example, the operation display unit 205 displays the setting ID and the candidate values of the setting ID based on the function ID, which are stored in the data storage unit 203, so that a user is allowed to select a candidate value by pressing the operation input unit 204 from among the displayed candidate values of the setting ID.

Figure 7:
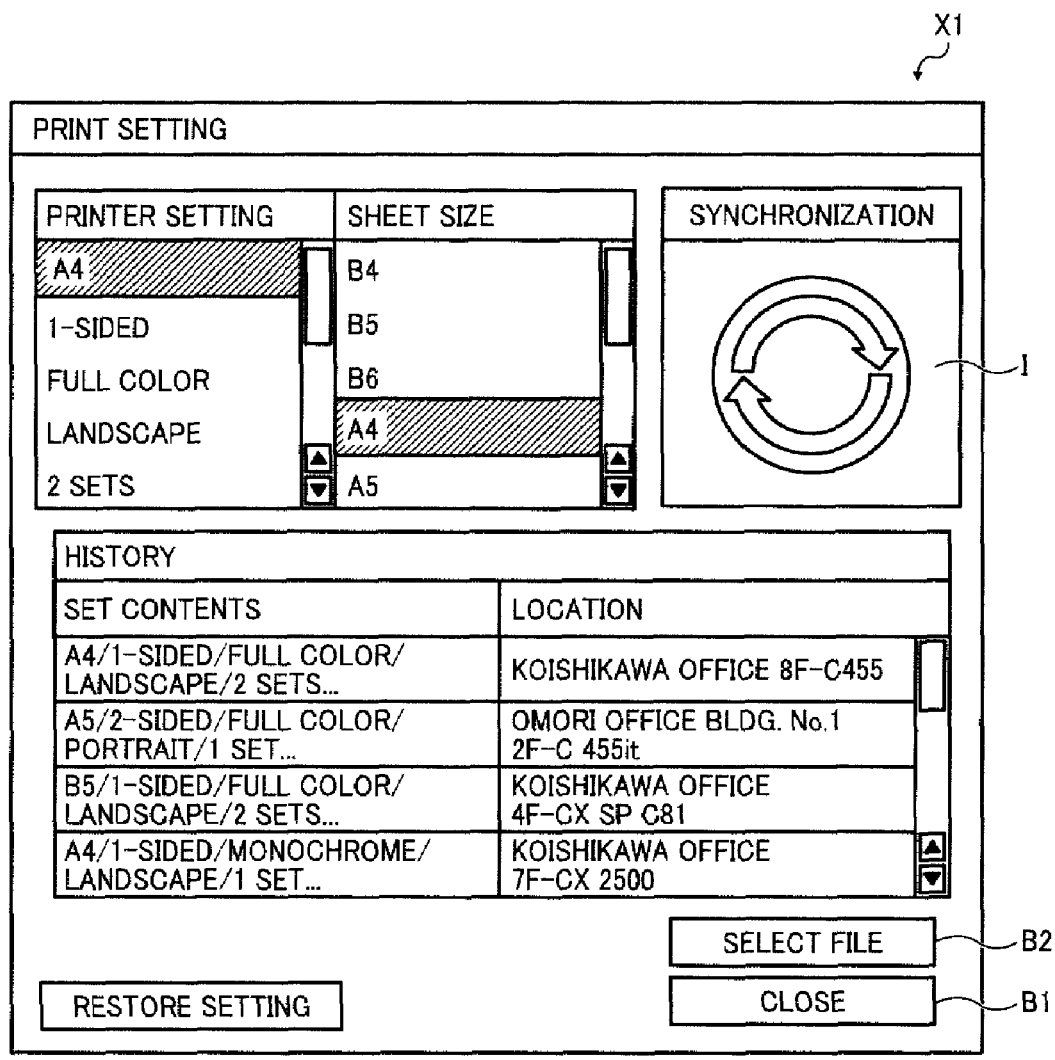
FIG. 7 is an explanatory diagram of an example of a screen displayed on an operation display unit shown in FIG. 3.

FIG. 7 is an explanatory diagram of an example of a screen displayed on the operation display unit 205. The screen shown in FIG. 7 is a print setting screen X1. As shown in FIG. 7, the print setting screen X1 contains, in an upper half thereof, a synchronization icon I and lists arranged in two rows for allowing a user to select setting items. More particularly, "printer setting" and "sheet size" are displayed as the setting IDs of the printer function, and candidate values associated with each of the setting IDs are also displayed. The candidate values, that is, the set values, selected through the operation display unit 205 are highlighted.

Figure 8:
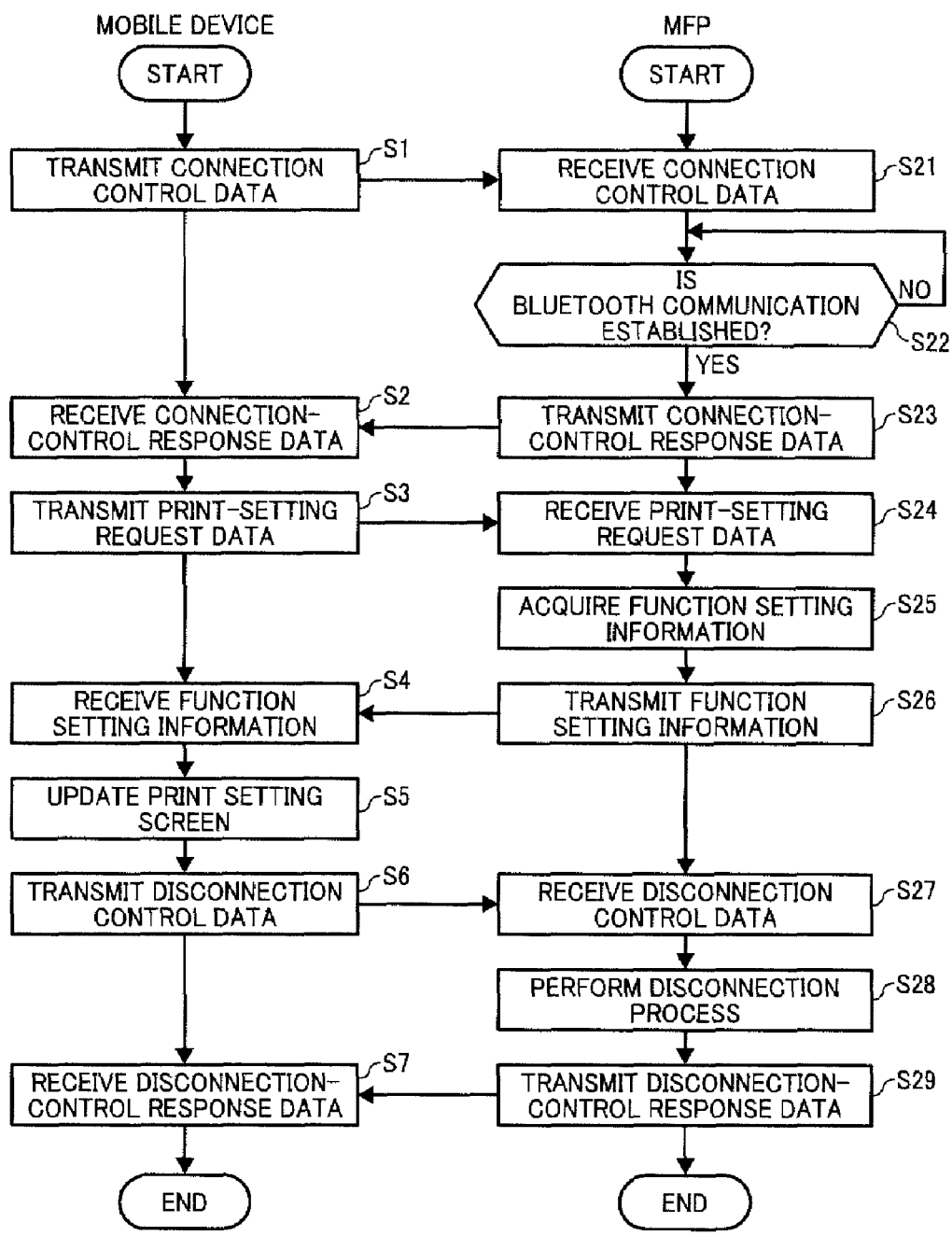
FIG. 8 is a flowchart of a process of acquiring print setting items according to the first embodiment.

A process of acquiring print setting items by the mobile terminal device 200 from the MFP 100 in the information processing system 10, which includes the MFP 100 and the mobile terminal device 200 having the configurations as described above, is described in detail below. FIG. 8 is a flowchart of the process of acquiring the print setting items.

A user presses the synchronization icon I on the print setting screen X1 shown in FIG. 7 to request connection to a printer of the MFP 100. The synchronization icon I functions as a synchronization declaring member that receives an instruction for declaring synchronization between the setting items that can be set in the MFP 100 and the setting items that can be set in the mobile terminal device 200. At this time, if connection control data written in the XML format as shown in FIG. 6 is used, a "RequestInfo" tag (not shown) is used.

Figure 9:
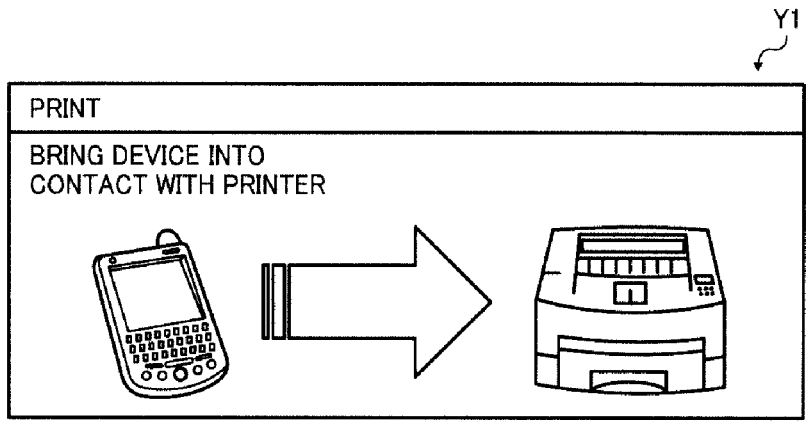
FIG. 9 is a schematic diagram of an example of a guide screen.

Upon receiving the connection control data sent from the operation input unit 204, the print control unit 206 displays a guide screen Y1 as shown in FIG. 9 on the operation display unit 205. In the guide screen Y1 shown in FIG. 9, a message "Bring device into contact with printer" is displayed to instruct the user to bring the mobile terminal device 200 into contact with the MFP 100. In this manner, a function of a message display unit is implemented.

Then, when the user moves the mobile terminal device 200 closer to the MFP 100 according to the instruction displayed on the guide screen Y1, a communication is established between the NFC communication unit 201 of the mobile terminal device 200 and the NFC communication unit 101 of the MFP 100.

When the communication is established between the NFC communication unit 201 of the mobile terminal device 200 and the NFC communication unit 101 of the MFP 100, the print control unit 206 of the mobile terminal device 200 transmits the connection control data containing the communication setting information to the MFP 100 through the NFC communication via the NFC communication unit 201 of the mobile terminal device 200 and the NFC communication unit 101 of the MFP 100 (Step S1).

The MFP 100 receives the connection control data containing the communication setting information from the mobile terminal device 200 (Step S21). When a Bluetooth communication is established with the mobile terminal device 200 based on the received communication setting information (YES at Step S22), the MFP 100 transmits connection-control response data to the mobile terminal device 200 via the Bluetooth communication unit 102 (Step S23).

Upon receiving the connection-control response data from the MFP 100 via the Bluetooth communication unit 202 (Step S2), the print control unit 206 of the mobile terminal device 200 transmits print-setting request data to the MFP 100 via the Bluetooth communication unit 202 (Step S3).

When the control unit 111 of the MFP 100 receives the print-setting request data via the Bluetooth communication unit 102 (Step S24), the control unit 111 acquires the function setting information from the setting-information storage unit 110 (Step S25). Then, the control unit 111 transmits the acquired function setting information as a response to the mobile terminal device 200 (Step S26).

Figure 10:
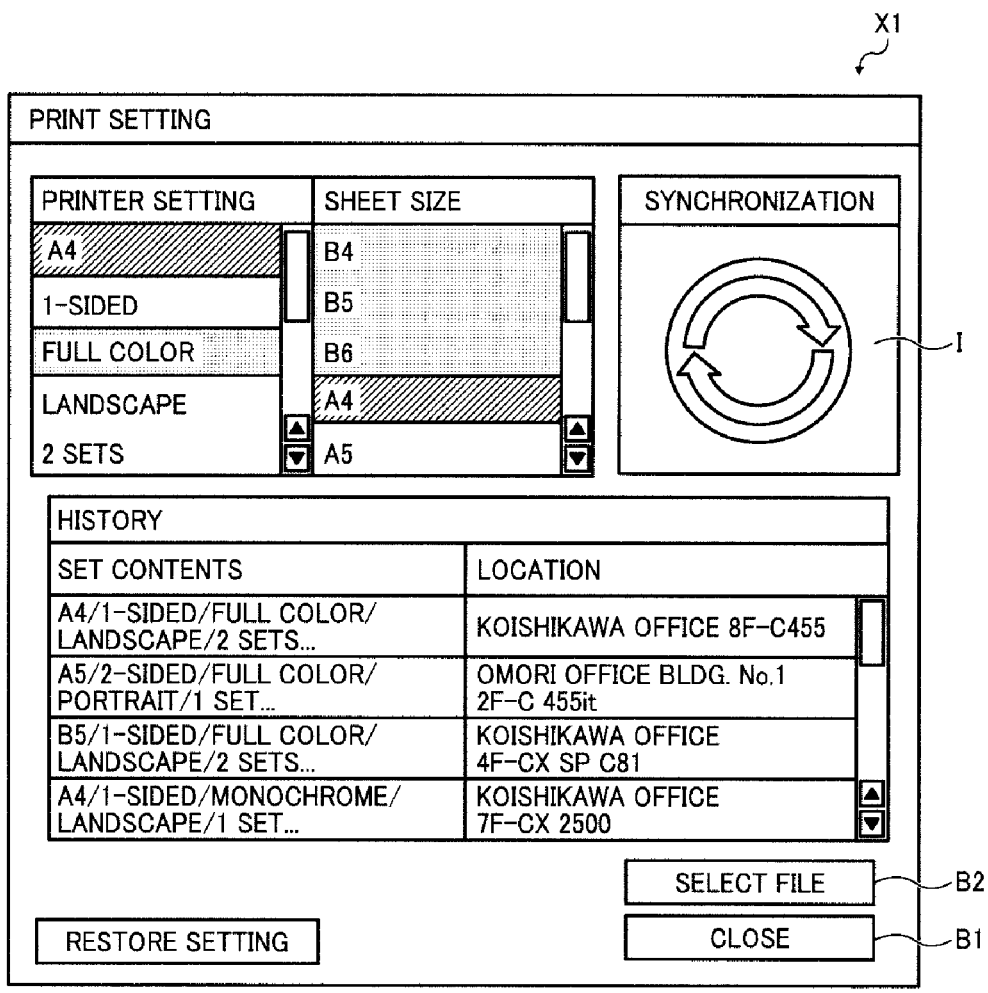
FIG. 10 is a schematic diagram of an example of a print setting screen.

Upon receiving the function setting information from the MFP 100 via the Bluetooth communication unit 202 (Step S4: a setting-item acquiring unit), the print control unit 206 of the mobile terminal device 200 updates the setting items on the print setting screen X1 shown in FIG. 7 (Step S5: a setting-screen display unit). When the updated setting items include unauthorized setting items, the unauthorized setting items are grayed out as shown in FIG. 10.

Then, when the user presses a "close" button B1 displayed on the operation display unit 205, the print control unit 206 of the mobile terminal device 200 transmits disconnection control data to the MFP 100 via the Bluetooth communication unit 202 (Step S6).

It is possible to cause the print control unit 206 to transmit the disconnection control data just after the setting items on the print setting screen X1 are updated before the "close" button B1 is pressed.

Upon receiving the disconnection control data via the Bluetooth communication unit 102 (Step S27), the control unit 111 of the MFP 100 performs a communication disconnection process (Step S28), and then transmits disconnection-control response data as a response to the mobile terminal device 200 (Step S29). In this manner, the communication can be enabled only when it is needed, so that the security of the MFP 100 and the mobile terminal device 200 can be assured.

The print control unit 206 of the mobile terminal device 200 receives the disconnection-control response data from the MFP 100 via the Bluetooth communication unit 202 (Step S7), and then process control ends.

Figure 11:
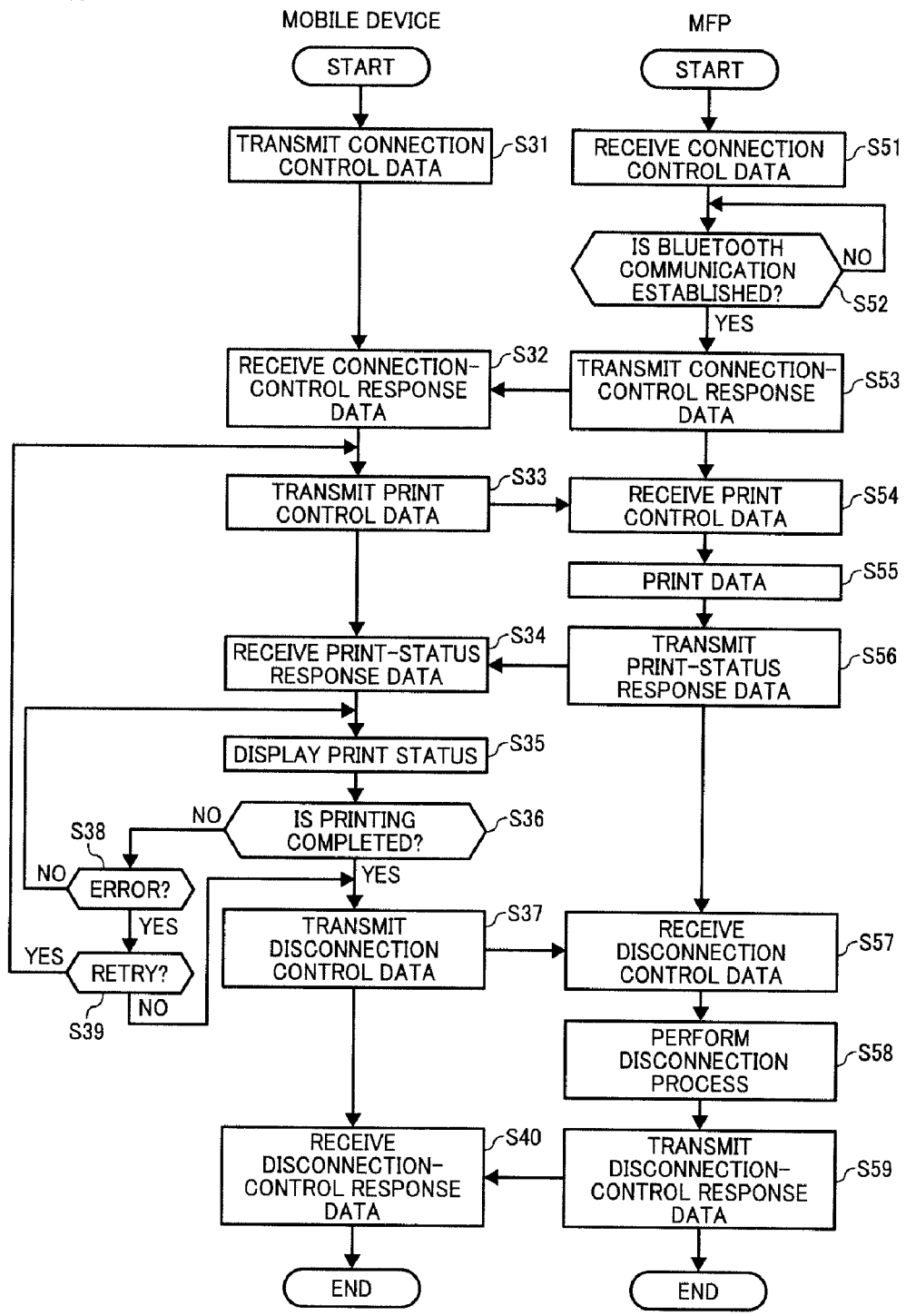
FIG. 11 is a flowchart of a process of requesting printing according to the first embodiment.

A process of requesting printing by the mobile terminal device 200 to the MFP 100 is described in detail below. FIG. 11 is a flowchart of the process of requesting printing according to the first embodiment.

Figure 12:
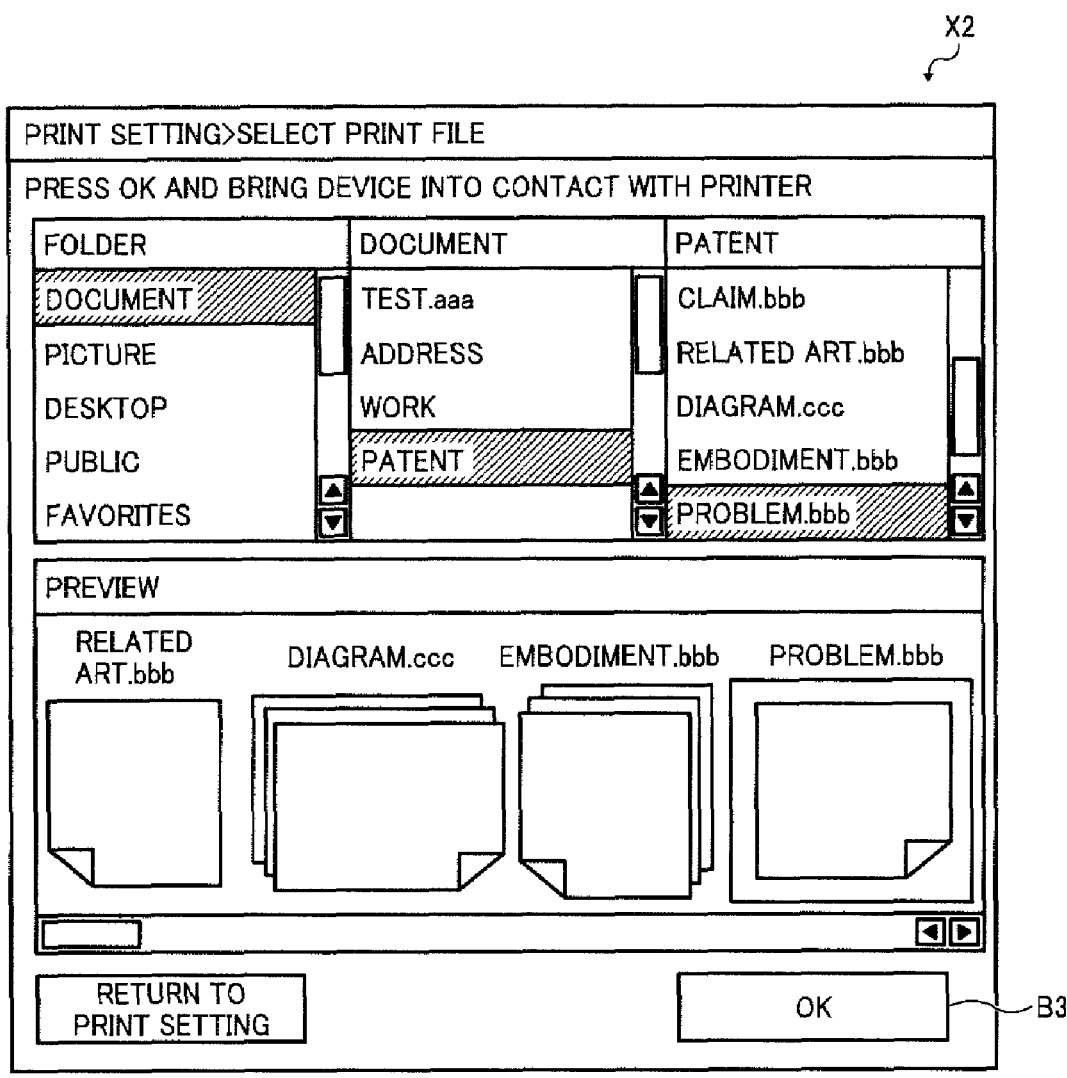
FIG. 12 is a schematic diagram of an example of a screen displayed for selecting a print file.

When the user specifies the print setting on the print setting screen X1 as shown in FIG. 7 and then presses a "select file" button B2, the print control unit 206 of the mobile terminal device 200 changes the screen on the operation display unit 205 to a print-file selection screen X2 as shown in FIG. 12.

The values corresponding to the print setting specified by the user through the print setting screen X1 as shown in FIG. 7 are stored as history information in the data storage unit 203. Thus, a function of a history-information storage unit is implemented. The history information contains the function setting information and is written in either a structured format such as the XML or a non-structured format such as the text format. The history information is displayed in a lower half of the print setting screen X1 as shown in FIG. 7, and contains the function setting information and information about a location where printing is performed. When the user selects one piece of the history information, the setting of the history information is read out from the data storage unit 203 so that corresponding setting items can be specified. With this configuration, the function setting information that is previously specified by the user can be stored and re-used, resulting in enhancing usability of the setting.

As shown in FIG. 12, the print-file selection screen X2 is structured such that a user is allowed to select a file from a list having a three-level hierarchical structure arranged in an upper half of the print-file selection screen X2. A preview of setting statuses of files are displayed in a lower half of the print-file selection screen X2.

The user selects a file to be printed from the list having the three-level hierarchical structure arranged in the upper half of the print-file selection screen X2 as shown in FIG. 12, and presses an "OK" button B3 to request printing.

Upon receiving a print request, the print control unit 206 of the mobile terminal device 200 displays the guide screen Y1 shown in FIG. 9 on the operation display unit 205. In the guide screen Y1 shown in FIG. 9, the message "Bring device into contact with printer" is displayed to instruct the user to bring the mobile terminal device 200 into contact with the MFP 100.

Then, when the user moves the mobile terminal device 200 closer to the MFP 100 according to the instruction displayed on the guide screen Y1, a communication is established between the NFC communication unit 201 of the mobile terminal device 200 and the NFC communication unit 101 of the MFP 100.

When the communication is established between the NFC communication unit 201 of the mobile terminal device 200 and the NFC communication unit 101 of the MFP 100, the print control unit 206 of the mobile terminal device 200 transmits the connection control data containing the communication setting information to the MFP 100 through the NFC communication via the NFC communication unit 201 of the mobile terminal device 200 and the NFC communication unit 101 of the MFP 100 (Step S31).

The MFP 100 receives the connection control data containing the communication setting information from the mobile terminal device 200 (Step S51). When a Bluetooth communication is established with the mobile terminal device 200 based on the received communication setting information (YES at Step S52), the MFP 100 transmits connection-control response data to the mobile terminal device 200 via the Bluetooth communication unit 102 (Step S53).

Upon receiving the connection-control response data from the MFP 100 via the Bluetooth communication unit 202 (Step S32), the print control unit 206 of the mobile terminal device 200 transmits print control data (see, for example, FIG. 6) to the MFP 100 via the Bluetooth communication unit 202 (Step S33: a processing-request transmitting unit).

Upon receiving the print control data via the Bluetooth communication unit 102 (Step S54), the control unit 111 of the MFP 100 controls the data processing unit 106 and the printer unit 107 to print data that has been subjected to the image processing or the layout processing (Step S55).

The control unit 111 of the MFP 100 transmits print-status response data containing print status (e.g., print completion, print in progress, print error, or no print job) to the mobile terminal device 200 via the Bluetooth communication unit 102 (Step S56).

The print control unit 206 of the mobile terminal device 200 receives the print-status response data from the MFP 100 via the Bluetooth communication unit 202 (Step S34: a status-information acquiring unit). Then, the print control unit 206 determines the print status based on the print-status response data, and displays a screen containing the print status on the operation display unit 205 (Step S35: a status-information display unit).

Figure 13:
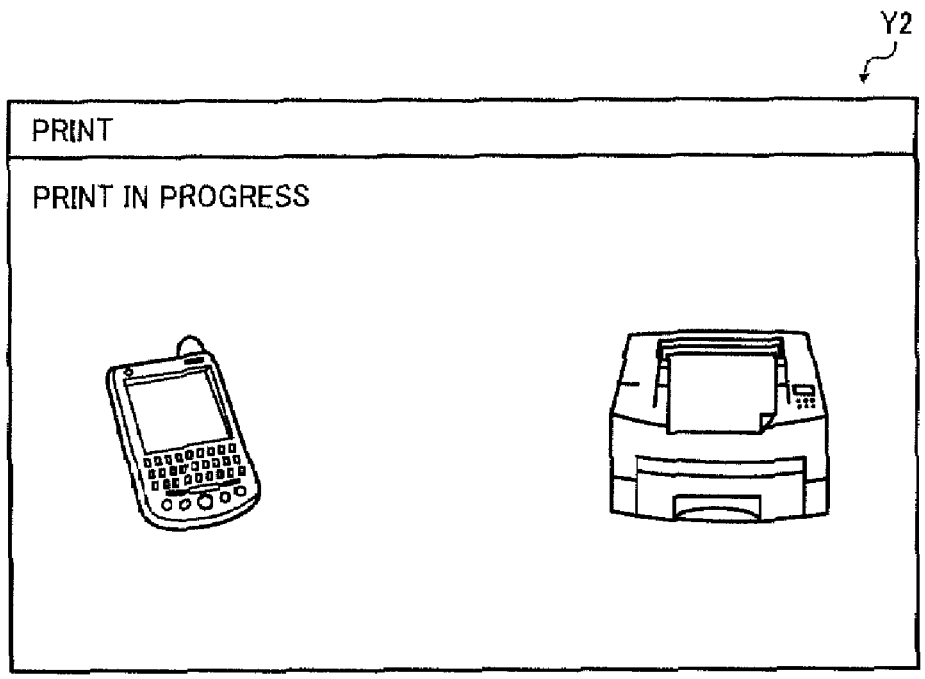
FIG. 13 is a schematic diagram of an example of a screen displayed during printing.

For example, when the print status contained in the print-status response data indicates "print in progress", the print control unit 206 of the mobile terminal device 200 displays a print-in-progress screen Y2 as shown in FIG. 13.

When determining that the printing is completed (YES at Step S36), the print control unit 206 of the mobile terminal device 200 transmits disconnection control data to the MFP 100 via the Bluetooth communication unit 202 (Step S37).

Figure 14:
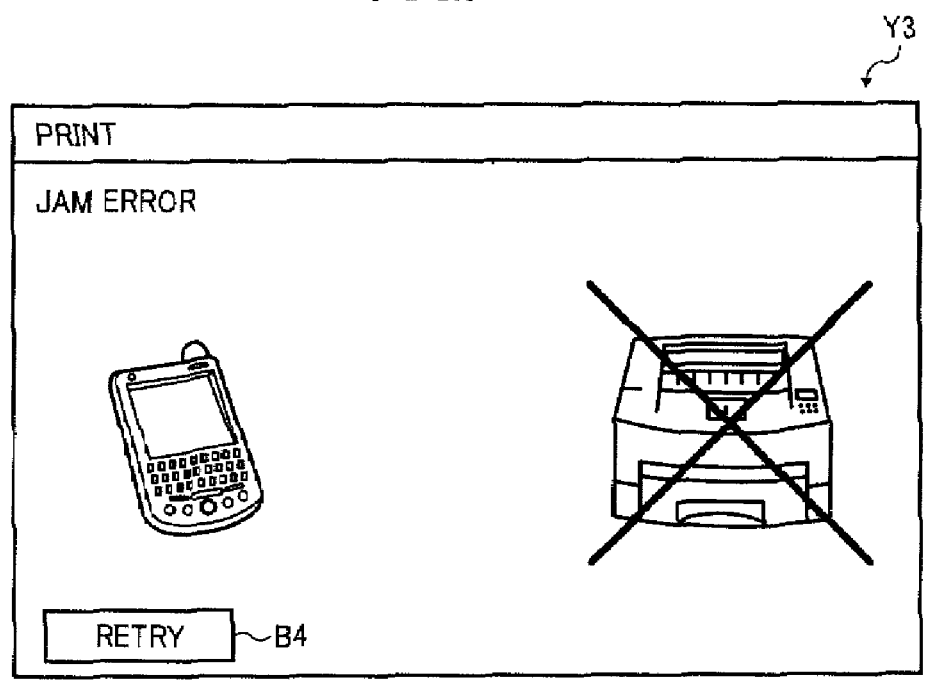
FIG. 14 is a schematic diagram of an example of a screen displayed when error occurs.

On the other hand, when determining that a print error has occurred, the print control unit 206 of the mobile terminal device 200 displays a print-error screen Y3 as shown in FIG. 14 on the operation display unit 205 (Step S35). If the user presses a retry button B4 on the print-error screen Y3, the print control unit 206 of the mobile terminal device 200 re-transmits the print control data (see, for example, FIG. 6) to the MFP 100 via the Bluetooth communication unit 202 (NO at Step S36, YES at Step S38, and YES at Step S39). On the other hand, if the user does not press the retry button B4 on the print-error screen Y3 (NO at Step S36, NO at Step S38, and NO at Step S39), the print control unit 206 of the mobile terminal device 200 transmits the disconnection control data to the MFP 100 via the Bluetooth communication unit 202 after a predetermined time has elapsed (Step S37).

As described above, by notifying the user of an operating status of the MFP 100, user's usability can be enhanced.

Upon receiving the disconnection control data via the Bluetooth communication unit 102 (Step S57), the control unit 111 of the MFP 100 performs a communication disconnection process (Step S58), and then transmits disconnection-control response data as a response to the mobile terminal device 200 (Step S59). In this manner, the communication can be enabled only when it is needed, so that the security of the MFP 100 and the mobile terminal device 200 can be assured.

The print control unit 206 of the mobile terminal device 200 receives the disconnection-control response data from the MFP 100 via the Bluetooth communication unit 202 (Step S40), and then process control ends.

In this manner, according to the first embodiment, the mobile terminal device 200 can receive the setting items from the MFP 100 by using the short-range communication unit (i.e., through the Bluetooth communication) according to a request for acquiring the setting items related to the information processing to be performed by the MFP 100 as the information processing apparatus, and display the setting screen containing the values of the received setting items in a selectable manner. Therefore, the mobile terminal device 200 can display and set the setting items that are available in the MFP 100 connected thereto through a wireless communication. As a result, user's usability of the mobile terminal device 200 and the MFP 100 can be enhanced.

While, in the first embodiment, it is explained that the mobile terminal device 200 includes both the NFC communication unit 201 and the Bluetooth communication unit 202, it is possible to provide the NFC communication unit 201 in one mobile terminal device and the Bluetooth communication unit 202 in another mobile terminal device so that corresponding communication can be established from each of the mobile terminal devices for exchanging data. For example, the mobile terminal device including the NFC communication unit 201 can be configured to store therein the authentication ID, the function ID, the communication setting information, and the function setting information, and transmit the information to the NFC communication unit 101 of the MFP 100. In this case, by configuring the other mobile terminal device including the Bluetooth communication unit 202 to transmit data to the MFP 100 by using the transmitted communication setting information, the function of the MFP 100 can be easily made available.

Furthermore, while, in the first embodiment, the MFP 100 is employed as the information processing apparatus, the present invention is not limited to this example. The present invention can be applied to other apparatuses having functions of exchanging data through a wireless communication, such as a printer, a digital camera, or a PC.

A second embodiment of the present invention is described in detail below with reference to FIGS. 15 to 19. The same components as those of the first embodiment are assigned with the same reference numerals, and explanation thereof is not repeated.

Figure 15:
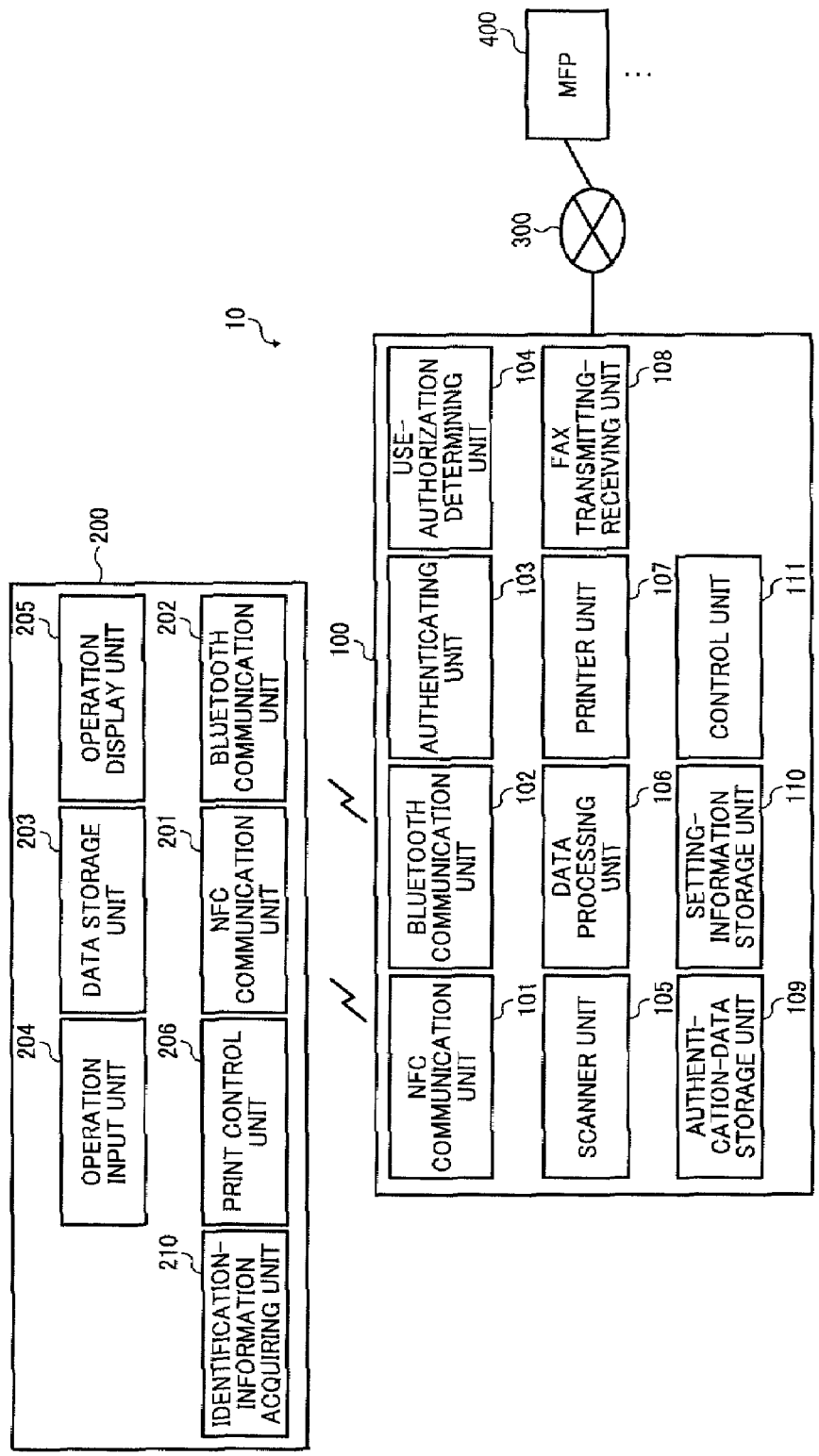
FIG. 15 is a block diagram of an information processing system according to a second embodiment of the present invention.

FIG. 15 is a block diagram of the information processing system 10 according to the second embodiment. As shown in FIG. 15, the information processing system 10 according to the second embodiment is different from that of the first embodiment in that the mobile terminal device 200 includes an identification-information acquiring unit 210 that functions as an identification-information acquiring unit.

The identification-information acquiring unit 210 acquires at least one type of identification information such as model information of the MFP 100, an apparatus ID unique to the MFP 100, information about a location where the MFP 100 is placed, physical location information indicating a physical location of the mobile terminal device 200, information about user's preference (e.g., a user ID, a belonging group, a post in an office, or information about print frequency), and information about charge (e.g., user identification information and charged price information).

As shown in FIG. 16, the print control unit 206 stores the function setting information that has been set by a user in the data storage unit 203 in association with the identification information acquired by the identification-information acquiring unit 210.

A procedure of a process of acquiring a history based on the model information of the MFP 100 is described below with reference to a flowchart of FIG. 17.

A user presses the synchronization icon I on the print setting screen X1 shown in FIG. 7 to request connection to a printer of the MFP 100. At this time, if connection control data written in the XML format as shown in FIG. 6 is used, a "RequestInfo" tag (not shown) is used.

Upon receiving the connection control data sent from the operation input unit 204, the print control unit 206 displays the guide screen Y1 as shown in FIG. 9 on the operation display unit 205. In the guide screen Y1 shown in FIG. 9, the message "Bring device into contact with printer" is displayed to instruct the user to bring the mobile terminal device 200 into contact with the MFP 100.

Then, when the user moves the mobile terminal device 200 closer to the MFP 100 according to the instruction displayed on the guide screen Y1, a communication is established between the NFC communication unit 201 of the mobile terminal device 200 and the NFC communication unit 101 of the MFP 100.

When the communication is established between the NFC communication unit 201 of the mobile terminal device 200 and the NFC communication unit 101 of the MFP 100, the print control unit 206 of the mobile terminal device 200 transmits the connection control data containing the communication setting information to the MFP 100 through the NFC communication via the NFC communication unit 201 of the mobile terminal device 200 and the NFC communication unit 101 of the MFP 100 (Step S1).

The MFP 100 receives the connection control data containing the communication setting information from the mobile terminal device 200 (Step S21). When a Bluetooth communication is established with the mobile terminal device 200 based on the received communication setting information (YES at Step S22), the MFP 100 transmits the connection-control response data to the mobile terminal device 200 via the Bluetooth communication unit 102 (Step S23).

Upon receiving the connection-control response data from the MFP 100 via the Bluetooth communication unit 202 (Step S2), the print control unit 206 of the mobile terminal device 200 transmits the print-setting request data to the MFP 100 via the Bluetooth communication unit 202 (Step S3).

When the control unit 111 of the MFP 100 receives the print-setting request data via the Bluetooth communication unit 102 (Step S24), the control unit 111 acquires the function setting information from the setting-information storage unit 110 (Step S25). Then, the control unit 111 transmits the acquired function setting information as a response to the mobile terminal device 200 (Step S26).

Upon receiving the function setting information from the MFP 100 via the Bluetooth communication unit 202 (Step S4), the print control unit 206 of the mobile terminal device 200 controls the identification-information acquiring unit 210 to acquire the model information of the MFP 100 (Step S61). When the identification-information acquiring unit 210 acquires the model information of the MFP 100, the print control unit 206 of the mobile terminal device 200 determines whether there is the function setting information corresponding to the same model of the MFP 100 in the history information stored in the data storage unit 203 (Step S62).

When the function setting information corresponding to the same model of the MFP 100 is contained in the history information stored in the data storage unit 203 (YES at Step S62), the print control unit 206 of the mobile terminal device 200 updates the print setting screen X1 with the set contents (see FIG. 16) of the stored function setting information and displays the updated print setting screen X1 (Step S63). On the other hand, when the function setting information corresponding to the same model of the MFP 100 is not contained in the history information stored in the data storage unit 203 (NO at Step S62), the print control unit 206 updates the print setting screen X1 based on the acquired function setting information (Step S64).

Then, when the user presses the "close" button B1 displayed on the operation display unit 205, the print control unit 206 of the mobile terminal device 200 transmits the disconnection control data to the MFP 100 via the Bluetooth communication unit 202 (Step S6).

It is possible to cause the print control unit 206 to transmit the disconnection control data just after the setting items on the print setting screen X1 are updated before the "close" button B1 is pressed.

Upon receiving the disconnection control data via the Bluetooth communication unit 102 (Step S27), the control unit 111 of the MFP 100 performs the communication disconnection process (Step S28), and then transmits the disconnection-control response data as a response to the mobile terminal device 200 (Step S29). In this manner, the communication can be enabled only when it is needed, so that the security of the MFP 100 and the mobile terminal device 200 can be assured.

The print control unit 206 of the mobile terminal device 200 receives the disconnection-control response data from the MFP 100 via the Bluetooth communication unit 202 (Step S7), and then process control ends.

An example in which the history is acquired based on the physical location information of the mobile terminal device 200 is described in detail below. The physical location information of the mobile terminal device 200 can be acquired by using a global positioning system (GPS), an access point of a wireless LAN, and the like. It is also possible to acquire, from the MFP 100, the physical location information that has been registered together with the function setting information in the MFP 100.

Figure 17:
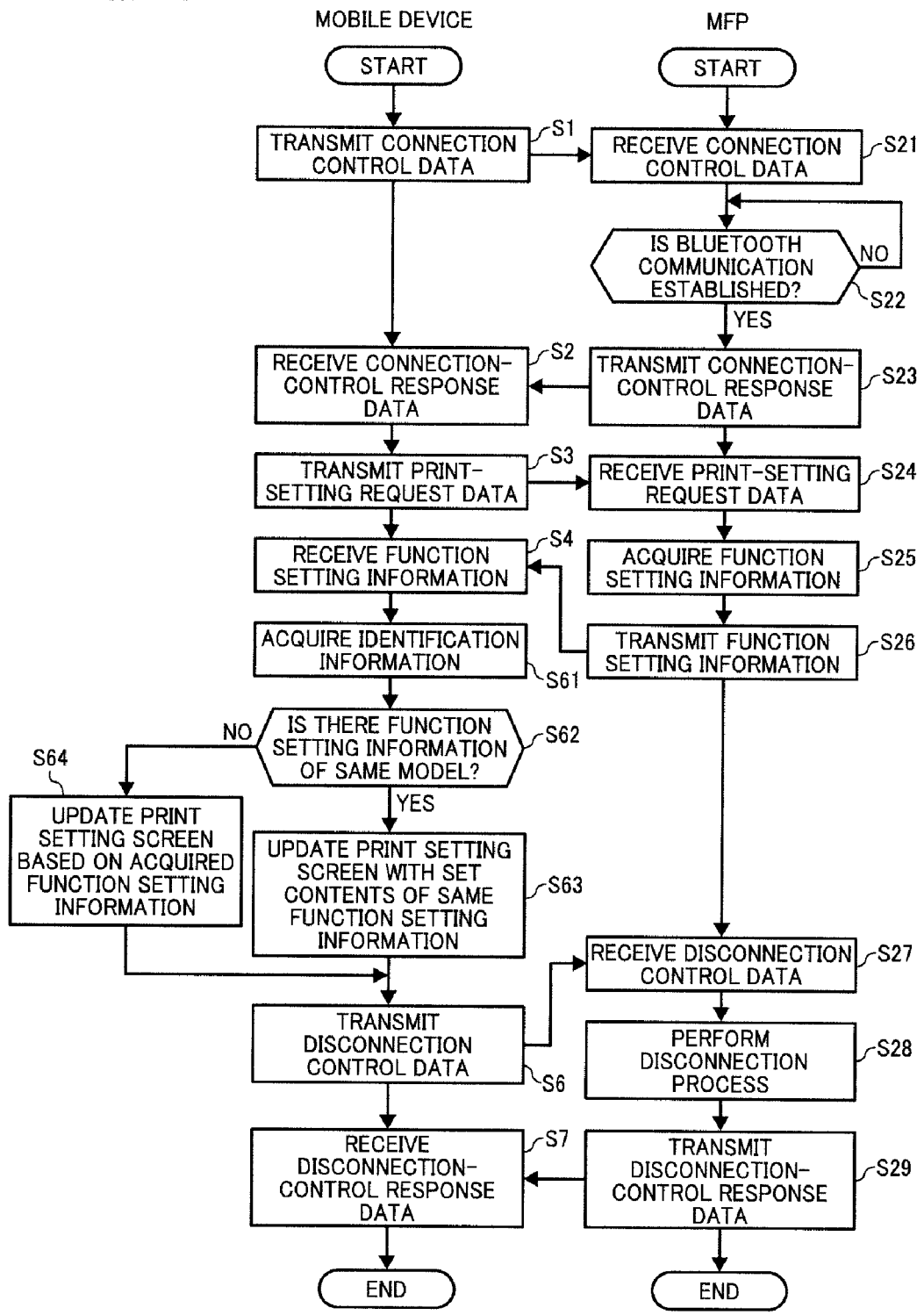
FIG. 17 is a flowchart of a process of acquiring a history based on model information according to the second embodiment.

As shown in FIG. 17, upon receiving the function setting information from the MFP 100 via the Bluetooth communication unit 202 (Step S4), the print control unit 206 of the mobile terminal device 200 controls the identification-information acquiring unit 210 functioning as the GPS to acquire the physical location information of the mobile terminal device 200 (Step S61). When the identification-information acquiring unit 210 acquires the physical location information of the mobile terminal device 200, the print control unit 206 of the mobile terminal device 200 determines whether there is the function setting information corresponding to the same location information as the physical location information indicating a current location of the mobile terminal device 200 in the history information stored in the data storage unit 203 as shown in FIG. 18 (Step S62).

When the function setting information corresponding to the physical location information indicating the current location of the mobile terminal device 200 is contained in the history information stored in the data storage unit 203 (YES at Step S62), the print control unit 206 of the mobile terminal device 200 updates the print setting screen X1 with settings of the stored function setting information stored (see FIG. 18), and displays the updated print setting screen X1 (Step S63). On the other hand, when the function setting information corresponding to the physical location information indicating the current location of the mobile terminal device 200 is not contained in the history information stored in the data storage unit 203 (NO at Step S62), the print control unit 206 of the mobile terminal device 200 updates the print setting screen X1 based on the acquired function setting information.

In this manner, according to the second embodiment, the history information can be acquired from the data storage unit 203 based on the identification information, and the setting items and the values of the setting items can be changed based on the history information. Therefore, print settings can be automatically set depending on the user's usage, resulting in enhancing the user's usability. For example, the user can immediately use the set values that the user has set for the same model of the MFP 100, so that the user's usability can be enhanced. Furthermore, when the location information indicating a current location of the mobile terminal device 200 is used as the identification information, the user can immediately determine whether desired processing is available in an apparatus connected to the mobile terminal device 200 at the current location.

A third embodiment of the present invention is described in detail below with reference to FIGS. 20 and 21. The same processing procedures as those of the first and the second embodiments are represented by the same reference numerals and explanation thereof is not repeated.

Figure 20:
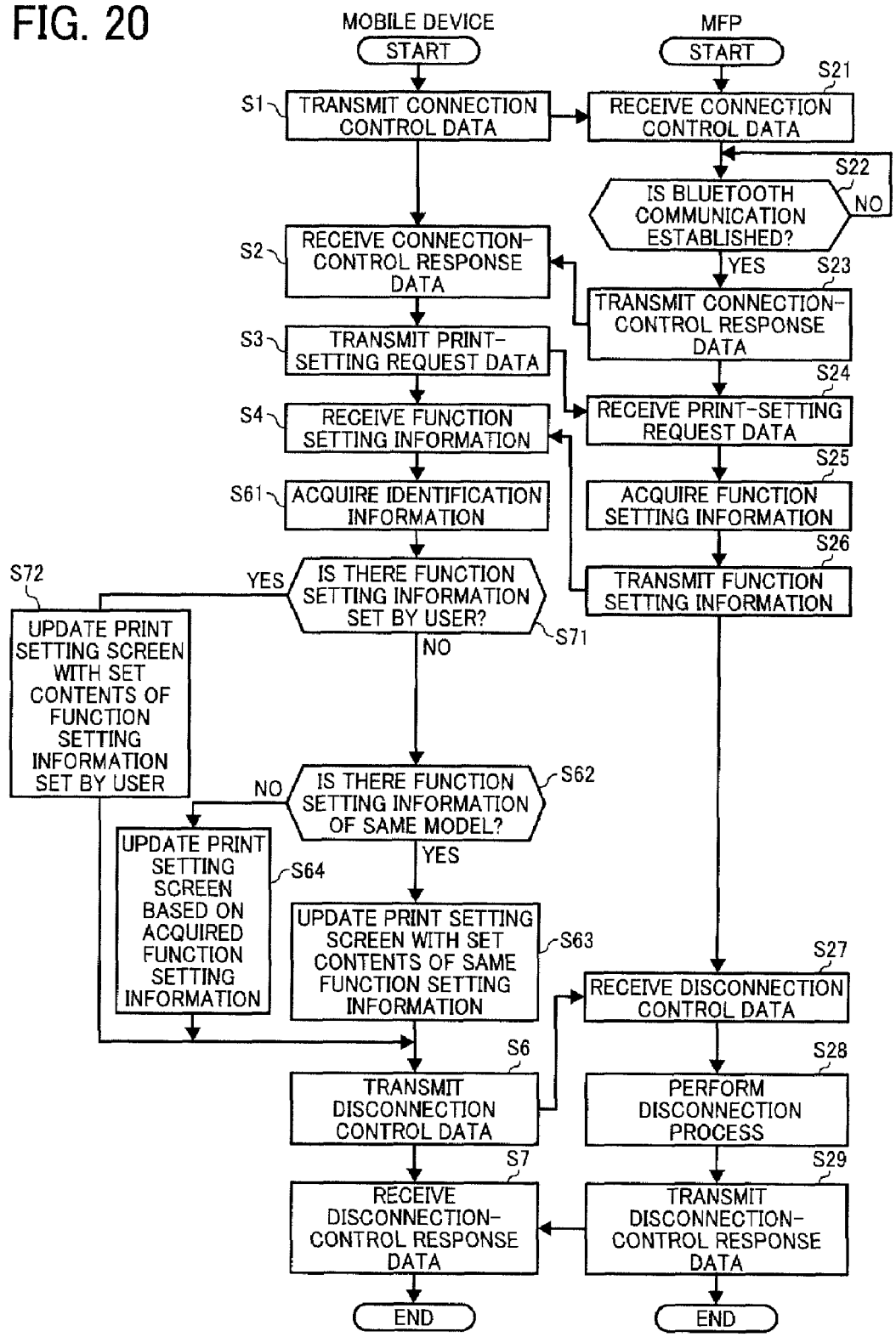
FIG. 20 is a flowchart of a process performed by an information processing system according to a third embodiment of the present invention.

FIG. 20 is a flowchart of a process performed by the information processing system 10 according to the third embodiment. As shown in FIG. 20, in the third embodiment, priority is put on the function setting information that has been set as default by a user.

More particularly, as shown in FIG. 20, when the function setting information is previously set as default by the user (see FIG. 21) is stored in the data storage unit 203 (YES at Step S71), the print control unit 206 of the mobile terminal device 200 updates the print setting screen X1 with set contents (see FIG. 21) of the previously-set function setting information, and displays the updated print setting screen X1 (Step S72). On the other hand, when the function setting information that is previously set as default by the user is not stored in the data storage unit 203 (NO at Step S71), and the function setting information corresponding to the same model of the MFP 100 is contained in the history information stored in the data storage unit 203 (YES at Step S62), the print control unit 206 of the mobile terminal device 200 updates the print setting screen X1 with the set contents (see FIG. 16) of the function setting information corresponding to the same model of the MFP 100, and displays the updated print setting screen X1 (Step S63). On the other hand, when the function setting information that is previously set as default by the user is not stored in the data storage unit 203 (NO at Step S71), and the function setting information corresponding to the same model of the MFP 100 is not contained in the history information stored in the data storage unit 203 (NO at Step S62), the print control unit 206 of the mobile terminal device 200 updates the print setting screen X1 based on the acquired function setting information (Step S64). When an item that has been set through setting by the user is not available in the MFP 100 (e.g., when the MFP 100 does not have a requested function such as a stapling function), a corresponding function is set according to the settings acquired by the MFP 100.

In this manner, a user interface of the mobile terminal device 200 can be properly customized based on user information containing the history information that is obtained as a result of optimization of available functions through negotiation between the function setting information set as default by the user and the functions available in the MFP 100.

A fourth embodiment of the present invention is described in detail below with reference to FIGS. 22 and 23. The same components and processing procedures as those of the first to the third embodiments are assigned with the same reference numerals and explanation thereof is not repeated.

FIG. 22 is a block diagram of the information processing system 10 according to the fourth embodiment. FIG. 23 is a flowchart of a process performed by the information processing system 10 according to the fourth embodiment. As shown in FIG. 22, the fourth embodiment is different from the second embodiment in that the mobile terminal device 200 includes a location acquiring unit 220. The mobile terminal device 200 according to the fourth embodiment causes the location acquiring unit 220 to acquire the physical location information indicating a current position of the mobile terminal device 200. More particularly, the location acquiring unit 220 validates an item "copy detection" contained in the function setting information when the mobile terminal device 200 is in a place corresponding to an organization to which the user belongs, and invalidates the item "copy detection" contained in the function setting information when the mobile terminal device 200 is out of the place corresponding to the organization to which the user belongs. At this time, as shown in FIG. 19, it is assumed that data related to the organization to which the user belongs is stored in advance in the data storage unit 203 to perform this determination. When the item "copy detection" is valid, the MFP 100 connected to the mobile terminal device 200 prints requested data. On the other hand, when the item "copy detection" is invalid, the MFP 100 connected to the mobile terminal device 200 does not print the requested data.

As shown in FIG. 23, the MFP 100 receives the connection control data containing the communication setting information from the mobile terminal device 200 (Step S51). When a Bluetooth communication is established with the mobile terminal device 200 based on the received communication setting information (YES at Step S52), the MFP 100 transmits the connection-control response data to the mobile terminal device 200 via the Bluetooth communication unit 102 (Step S53).

When the print control unit 206 of the mobile terminal device 200 receives the connection-control response data from the MFP 100 via the Bluetooth communication unit 202 (Step S32), the location acquiring unit 220 of the mobile terminal device 200 acquires information about a current location (Step S81). Then, the mobile terminal device 200 compares the current location with data shown in FIG. 19, and determines whether data output is valid at the current location (Step S82). When the data output is invalid (NO at Step S82), the mobile terminal device 200 ends the process without transmitting the print control data. On the other hand, when the output is valid (YES at Step S82), the mobile terminal device 200 transmits the print control data (see FIG. 6) to the MFP 100 via the Bluetooth communication unit 202 (Step S33: the processing-request transmitting unit).

The processing based on the setting of valid or invalid is not limited to the above-described example. It is possible to apply a commonly-known copy guard function. For example, when the item "copy detection" is set as invalid, it is possible to output a white sheet regardless of images requested to be printed, print only a character "copy prohibited" or the like on a printed sheet, or black out an image on a printed sheet, as a printing result.

In this manner, validity of the copy detection can be automatically determined based on a location where a user of the mobile terminal device attempts to perform printing. Therefore, user's usability can be enhanced, and a risk of information leakage due to copying can be prevented.

According to one aspect of the present invention, user's usability of the MFP and the mobile terminal device can be enhanced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile terminal device that establishes a wireless connection by a first communication unit when moved close to an information processing apparatus that performs an information processing, receives communication setting information for a second communication unit that is capable of enabling a wireless communication in a wider range than the first communication unit, and establishes a wireless communication by the second communication unit based on the communication setting information, the mobile terminal device comprising:
   a setting-item acquiring unit that receives, from the information processing apparatus, a setting item relating to an information processing performed by the information processing apparatus through the second communication unit in response to a request for acquiring the setting item;
   a setting-screen display unit that displays a setting screen on which a value of the setting item is displayed in a selectable manner; and
   a history-information storage unit that stores in a storage unit a value of a setting item selected on the setting screen as history information, with identification information for identifying the history information, wherein
   the identification information for identifying the history information is present physical location information of the mobile terminal device,
   the mobile terminal device further comprises an identification-information acquiring unit that acquires the present physical location information of the mobile terminal device, and
   the setting-screen display unit retrieves the history information associated with the acquired present physical location information of the mobile terminal device from the history-information storage unit, and displays on the setting screen a setting content based on the retrieved history information.

2. The mobile terminal device according to claim 1, wherein
   the setting screen includes a synchronization declaring member that receives an instruction for declaring a synchronization between a setting item that can be set in the information processing apparatus and a setting item that can be set in the mobile terminal device, and
   the mobile terminal device further comprises a message display unit that displays a message to move the mobile terminal device close to the information processing apparatus on the setting screen when the synchronization declaring member receives the instruction.

3. The mobile terminal device according to claim 1, further comprising a processing-request transmitting unit that transmits, to the information processing apparatus, data to be processed by the information processing apparatus and a processing request including the value of the setting item selected on the setting screen.

4. The mobile terminal device according to claim 3, further comprising:
   a status-information acquiring unit that receives status information of an information processing performed by the information processing apparatus in response to the processing request through the second communication unit; and
   a status-information display unit that displays the status information on the setting screen.

5. The mobile terminal device according to claim 3, wherein the processing-request transmitting unit transmits, to the information processing apparatus, a processing request including the history information associated with the identification information as the value of the setting item selected on the setting screen.

6. The mobile terminal device according to claim 5, wherein the identification information is model information of the information processing apparatus.

7. A method of establishing a wireless communication in a mobile terminal device that establishes a wireless connection by a first communication unit when moved close to an information processing apparatus that performs an information processing, receives communication setting information for a second communication unit that is capable of enabling a wireless communication in a wider range than the first communication unit, and establishes a wireless communication by the second communication unit based on the communication setting information, the method comprising:
   acquiring, by the mobile terminal device receiving from the information processing apparatus, a setting item relating to an information processing performed by the information processing apparatus through the second communication unit in response to a request for acquiring the setting item;
   displaying, by the mobile terminal device, a setting screen on which a value of the setting item is displayed in a selectable manner;
   storing in a storage unit a value of a setting item selected on the setting screen as history information, with identification information for identifying the history information;
   acquiring present physical location information of the mobile terminal device to be used as the identification information for identifying the history information;
   retrieving the history information associated with the acquired present physical location information of the mobile terminal device; and
   displaying, on the setting screen of the mobile terminal device, a setting content based on the retrieved history information.

8. A computer program product comprising computer-readable program codes embodied in a non-transitory computer-usable medium and provided to establish a wireless communication in a mobile terminal device that establishes a wireless connection by a first communication unit when moved close to an information processing apparatus that performs an information processing, receives communication setting information for a second communication unit that is capable of enabling a wireless communication in a wider range than the first communication unit, and establishes a wireless communication by the second communication unit based on the communication setting information, the program codes when executed causing the mobile terminal device to perform a method including:

acquiring, by the mobile terminal device from the information processing apparatus, a setting item relating to an information processing performed by the information processing apparatus through the second communication unit in response to a request for acquiring the setting item;

displaying, by the mobile terminal device, a setting screen on which a value of the setting item is displayed in a selectable manner;

storing in a storage unit a value of a setting item selected on the setting screen as history information, with identification information for identifying the history information;

acquiring present physical location information of the mobile terminal device to be used as the identification information for identifying the history information;

retrieving the history information associated with the acquired present physical location information of the mobile terminal device; and displaying, on the setting screen of the mobile terminal device, a setting content based on the retrieved history information.

* * * * *